United States Patent
Ganigarakoppal Kantharaju et al.

(10) Patent No.: US 12,216,595 B1
(45) Date of Patent: Feb. 4, 2025

(54) DIRECT-ATTACHED STORAGE DEVICE SOFTWARE RAID BOOT SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,055

(22) Filed: Jul. 31, 2023

(51) Int. Cl.
  *G06F 13/16* (2006.01)
  *G06F 9/4401* (2018.01)
  *G06F 13/42* (2006.01)

(52) U.S. Cl.
  CPC ........ *G06F 13/1668* (2013.01); *G06F 9/4406* (2013.01); *G06F 13/4221* (2013.01)

(58) Field of Classification Search
  CPC . G06F 13/1668; G06F 9/4406; G06F 13/4221
  USPC .................................................. 711/114, 112
  See application file for complete search history.

(56) References Cited

U.S. PATENT DOCUMENTS

| | | | |
|---|---|---|---|
| 9,501,442 B2 | 11/2016 | Kramer et al. | |
| 10,855,451 B1 * | 12/2020 | Allo | H04L 9/3263 |
| 2017/0357500 A1 * | 12/2017 | Vidyadhara | G06F 9/4411 |

* cited by examiner

*Primary Examiner* — David Yi
*Assistant Examiner* — Zubair Ahmed
(74) *Attorney, Agent, or Firm* — Joseph Mencher

(57) ABSTRACT

A direct-attached storage device software RAID boot system includes a chassis housing PCIe subsystems coupled to a UEFI subsystem and a software RAID subsystem. The software RAID subsystem identifies a first PCIe subsystem that is not claimed by a UEFI driver provided by the UEFI subsystem, and determines that the first PCIe subsystem is one of a PCIe bridge device or a PCIe root device. In response, the software RAID subsystem claims the first PCIe subsystem, installs a RAID protocol on the first PCIe subsystem, attaches at least one RAID logical storage subsystem provided by at least one PCIe endpoint device in the PCIe subsystems to the first PCIe subsystem, and presents the UEFI subsystem with a PCIe controller device in the first PCIe subsystem as being connected to the at least RAID logical storage subsystem.

20 Claims, 22 Drawing Sheets

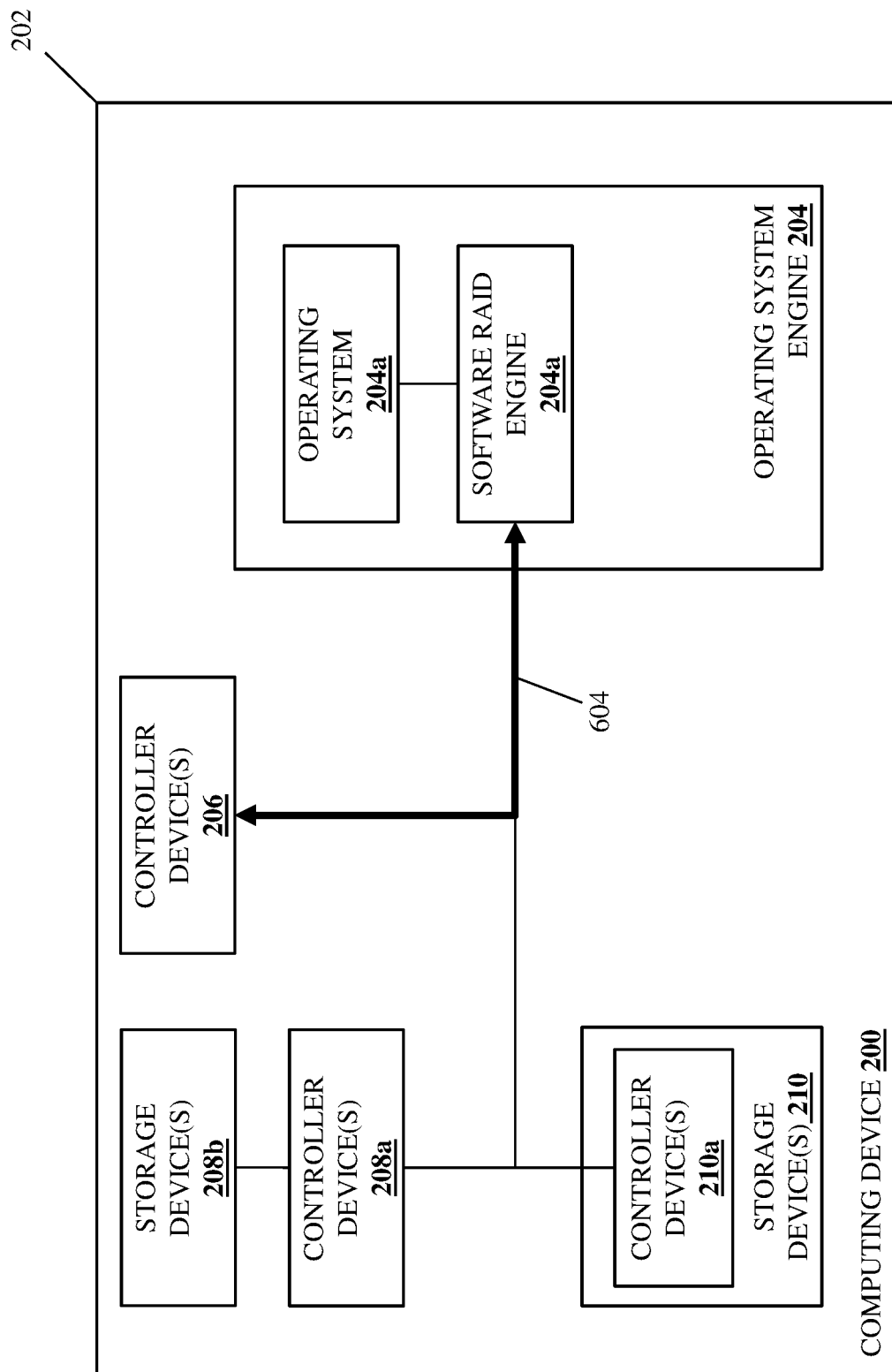

DIRECT-ATTACHED STORAGE DEVICE SOFTWARE RAID BOOT SYSTEM

CROSS-REFERENCE TO RELATED APPLICATIONS

The present application is related to the following co-pending applications: (1) U.S. Patent application Ser. No. 18/228,006, filed Jul. 31, 2023; (2) U.S. patent application Ser. No. 18/228,015, filed Jul. 31, 2023; (3) U.S. patent application Ser. No. 18/228,028, filed Jul. 31, 2023; and (4) U.S. patent application Ser. No. 18/229,293, filed Aug. 2, 2023.

BACKGROUND

The present disclosure relates generally to information handling systems, and more particularly to providing for booting of an information handling system using a direct-attached storage device software RAID.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, operating systems in server devices and/or other computing devices known in the art use connected storage devices to store their data, and the protection of such data in the event of the unavailability of any of those storage devices is desirable. An option for protecting data stored on storage devices like those described above includes the utilization of Redundant Array of Independent Disk (RAID) techniques, which one of skill in the art in possession of the present disclosure will recognize is a data storage virtualization technology that combines multiple physical storage devices into one or more logical storage devices for the purposes of data redundancy, performance improvements, and/or other RAID benefits that would be apparent to one of skill in the art in possession of the present disclosure. However, the utilization of RAID techniques on data stored by an operating system in a server device can raise some issues.

For example, the WINDOWS® operating system available from MICROSOFT® Corp. of Redmond, Washington, United States, utilizes a "storage spaces" data protection solution that may be configured to protect data from storage device unavailability discussed above by aggregating storage devices connected to a server/host device via the RAID techniques discussed above, and creating a logical storage device. However, such "storage spaces" data protection solutions do not provide the ability to configure the logical storage device during pre-boot or other initialization operations for the server device, which prevents the installation of the WINDOWS® operating system on that logical storage device. One solution to such issues is the provisioning of a hardware-based RAID data protection solution in the server device that implements hardware-based RAID data protection techniques on data stored in the storage devices in the server device, but such hardware-based RAID data protection solutions are relatively expensive.

Another solution to such issues is the use of a software RAID data protection solution in the server device like that provided in the Virtual RAID on Central Processing Unit (CPU) (VROC) data protection solution available in CPUs provided by INTEL® corporation of Santa Clara, California, United States. However, the VROC data protection solution discussed above is relatively limited in that it is only provided with INTEL® CPUs, may only be utilized with Non-Volatile Memory express (NVMe) storage devices and Serial AT Attachment (SATA) storage devices, only provides RAID1 and RAID5 data protection, and requires Volume Management Device (VMD) hardware in the CPU. As such, the VROC data protection solutions discussed above do not operate with some types of storage devices (e.g., Serial Attached Small Computer System Interface (SCSI) (SAS) storage devices) or some types of CPUs (e.g., CPUs available from Advance Micro Devices (AMD) of Santa Clara, California, United States). Furthermore, the VROC data protection solutions discussed above are also associated with relatively high licensing costs.

Accordingly, it would be desirable to provide a direct-attached storage device software RAID system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software Redundant Array of Independent Disk (RAID) engine that is configured to: identify, from a plurality of Peripheral Component Interconnect express (PCIe) subsystems that are coupled to the processing system, a first PCIe subsystem that is not claimed by a Unified Extensible Firmware Interface (UEFI) driver provided by a UEFI subsystem that is coupled to the processing system; and determine that the first PCIe subsystem is one of a PCIe bridge device or a PCIe root device and, in response: claim the first PCIe subsystem; install a RAID protocol on the first PCIe subsystem; attach, to the first PCIe subsystem, at least one RAID logical storage subsystem provided by at least one PCIe endpoint device that is included in the plurality of PCIe subsystems; and present, to the UEFI subsystem, a PCIe controller device that is included in the first PCIe subsystem as connected to the at least RAID logical storage subsystem.

BRIEF DESCRIPTION OF THE DRAWINGS

FIG. 6C is a schematic view illustrating an embodiment of the operation of the computing device of FIG. 2 during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
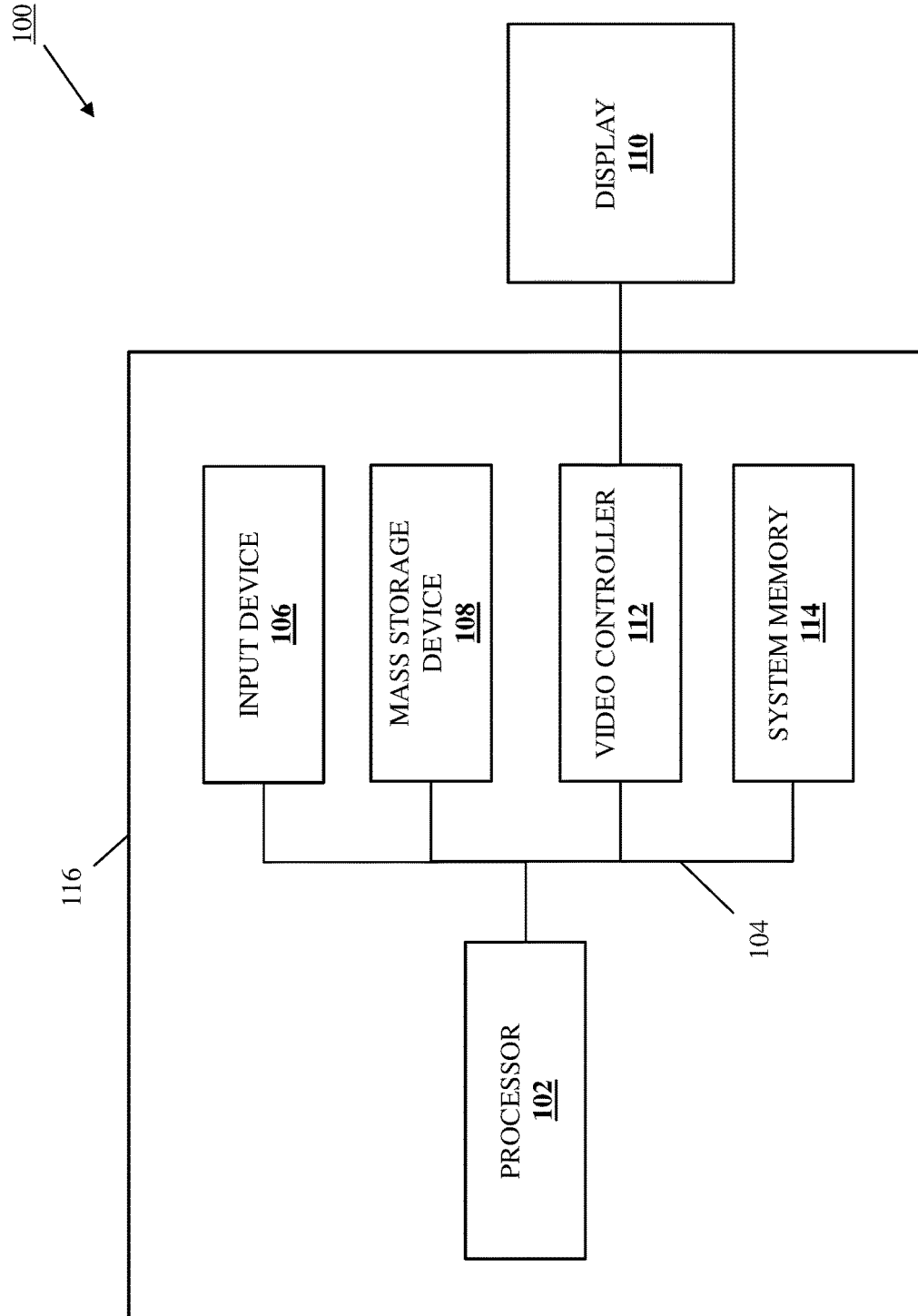
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
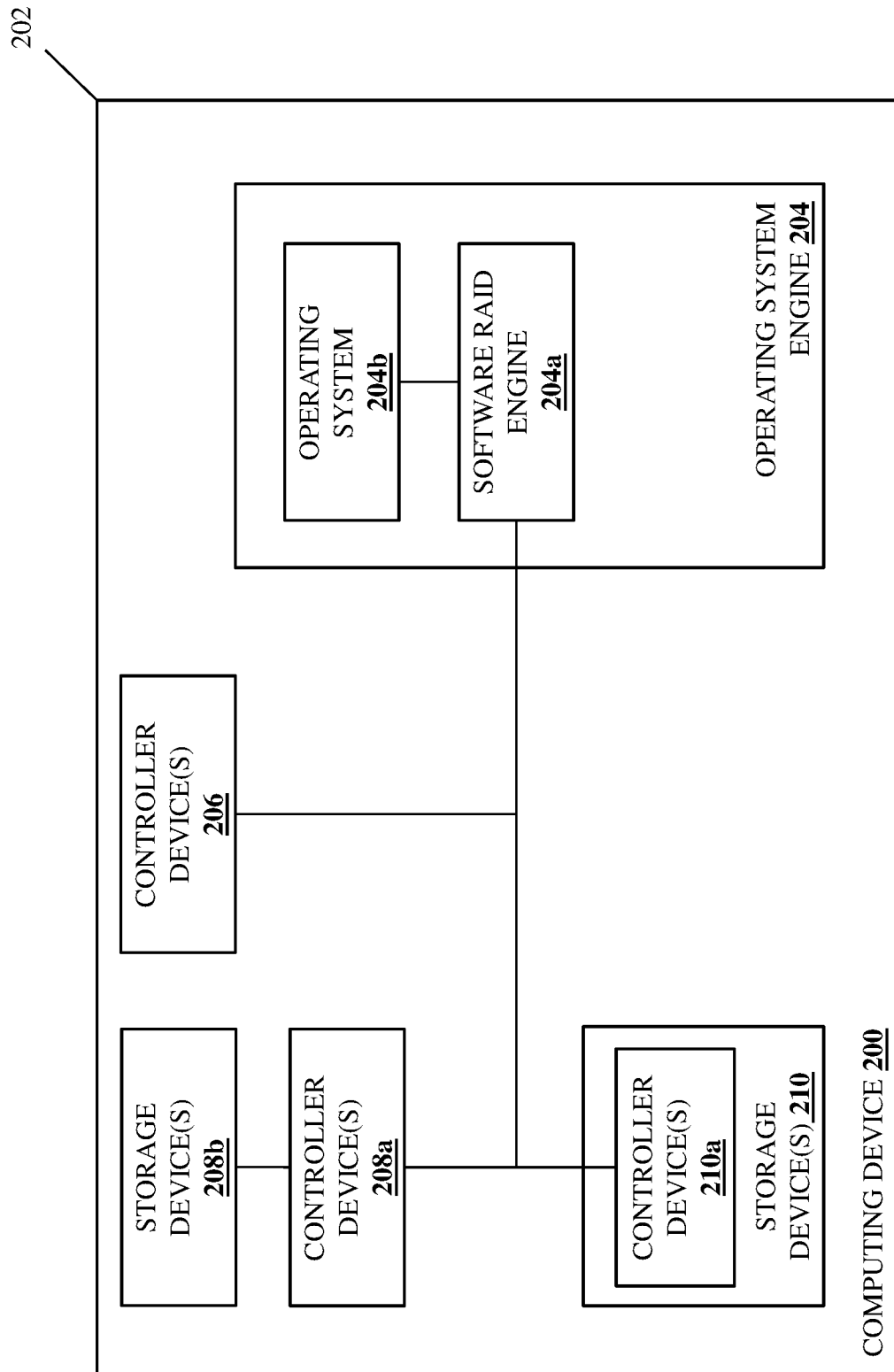
FIG. 2 is a schematic view illustrating an embodiment of a computing device that may include the direct-attached storage device software RAID system of the present disclosure.

Referring now to FIG. 2, an embodiment of a computing device 200 is illustrated that may include the direct-attached storage device software RAID system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as Dynamic Random Access Memory (DRAM)) that is coupled to the processing system and that includes instructions that, when executed by the processing system, cause the processing system to provide an operating system engine 204 that is configured to perform the functionality of the operating system engines and/or computing devices discussed below. In the illustrated embodiment, the memory system may also include instructions that, when executed by the processing system, cause the processing system to provide a software RAID engine 204a that is configured to perform the functionality of the software RAID engines, software RAID subsystems, and/or computing devices discussed below.

To provide a specific example, the software RAID engine 204a may include a software RAID driver that is configured to utilize hardware resources in the computing device (e.g., the CPU, memory, etc.) in order to create and manage RAID infrastructure and/or perform any of a variety of RAID operations known in the art without the need for dedicated/specialized RAID hardware (e.g., a dedicated hardware RAID controller). However, while the software RAID engine 204a is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the software RAID engine 204a may be provided separately from the operating system/operating system engine 204 while remaining within the scope of the present disclosure as well.

In an embodiment, the software RAID driver in the software RAID engine 204a will include a Small Computer System Interface (SCSI)-based driver, and one of skill in the art in possession of the present disclosure will appreciate how such a SCSI-compliant driver may be configured to be utilized with any PCIe devices/PCIe controller devices (e.g., Advanced Host Controller Interface (AHCI) controllers, SAS controllers, virtual PCIe controllers, NVMe controllers, etc.), thus allowing a computing device manufacturer to provide a single SCSI-based software RAID driver on a plurality of different computing device configurations of computing devices manufactured by the computing device manufacturer in order to enable the software RAID functionality described below in any of those computing devices using the PCIe devices/PCIe controller devices included in those computing devices. To provide a specific example, the software RAID driver in the software RAID engine 204a may be implemented via the Storport/miniport model used in the WINDOWS® operating system, although other software RAID driver configurations will fall within the scope of the present disclosure as well.

In the illustrated embodiment, the memory system may also include instructions that, when executed by the processing system, cause the processing system to provide an operating system 204b that is configured to use and control the hardware resources in the computing device 200, and/or perform any of the other functionality of the operating systems and/or computing devices discussed below. For example, the operating system 204b may be provided by a WINDOWS® operating system available from MICROSOFT® Corp. of Redmond, Washington, United States, although other operating systems are envisioned as falling within the scope of the present disclosure as well.

In the illustrated embodiment, the chassis 202 also houses one or more controller devices 206 that are coupled to the software RAID engine 204a (e.g., via a coupling between the controller device(s) 206 and the processing system that provides the software RAID engine 204a). As discussed in the specific examples provided below, the controller device(s) 206 may be provided by Peripheral Component Interconnect express (PCIe) controller devices that may be included in and/or coupled to PCIe devices that are not provided by storage devices. For example, the PCIe controller device(s) 206 may be physical or virtual PCIe controller devices and may be included in Host Bus Adapter (HBA) devices, Advanced Host Controller Interface (AHCI) devices, and/or other PCIe devices that would be apparent to one of skill in the art in possession of the present disclosure. However, while illustrated and described as being provided by PCIe controller device(s), one of skill in the art in possession of the present disclosure will appreciate how the controller device(s) 206 may be provided by other types of controller devices while remaining within the scope of the present disclosure as well.

In the illustrated embodiment, the chassis 202 also houses one or more controller devices 208a that are coupled to the software RAID engine 204a (e.g., via a coupling between the controller device(s) 208a and the processing system that provides the software RAID engine 204a). As illustrated and discussed in the specific examples provided below, the controller device(s) 208a may be provided by Peripheral Component Interconnect express (PCIe) storage controller devices that are coupled to one or more storage devices 208b that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 208a may be provided by physical or virtual PCIe storage controller devices and may include PCIe storage controller devices configured as NVMe storage controllers, SAS storage controllers, SATA storage controllers, and/or other PCIe storage controller devices that would be apparent to one of skill in the art in possession of the present disclosure. However, while illustrated and described as being provided by PCIe controller device(s), one of skill in the art in possession of the present disclosure will appreciate how the controller device(s) 208a may be provided by other types of controller devices while remaining within the scope of the present disclosure as well.

In the illustrated embodiment, the chassis 202 also houses one or more controller devices 210a that are coupled to the software RAID engine 204a (e.g., via a coupling between the controller device(s) 208a and the processing system that provides the software RAID engine 204a). As illustrated and discussed in the specific examples provided below, the controller device(s) 210a may be provided by Peripheral Component Interconnect express (PCIe) controller devices that are included in one or more storage devices 210 that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 210a may be provided by physical or virtual PCIe storage controller devices and may include PCIe storage controller devices configured as NVMe storage controllers. However, while illustrated and described as being provided by PCIe controller device(s), one of skill in the art in possession of the present disclosure will appreciate how the controller device(s) 210*a* may be provided by other types of controller devices while remaining within the scope of the present disclosure as well.

However, while three different embodiments of controller devices 206, 208*a*, and 210*a* are illustrated and described as being included in the computing device 200 (e.g., stand-alone controller device(s), storage-device-connected controller device(s), and storage-device-integrated controller device(s)), one of skill in the art in possession of the present disclosure will appreciate how one or more of the controller devices 206, 208*a*, and/or 210*a* may be omitted from the computing device 200 while remaining within the scope of the present disclosure as well. Furthermore, while not explicitly illustrated, one of skill in the art in possession of the present disclosure will appreciate how any of the controller devices 208*a* and/or 210*a* may be coupled to and/or may control multiple storage devices 208*b* and/or 210, respectively, while remaining within the scope of the present disclosure as well.

Further still, one of skill in the art in possession of the present disclosure will appreciate how storage devices may be coupled to the software RAID engine 204*a* via multiple controller devices (e.g., when an NVMe storage device with an integrated controller device is connected via an external controller device to the software RAID engine 204*a*). As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the direct-attached storage device software RAID functionality discussed below, while remaining within the scope of the present disclosure as well.

For example, one of skill in the art in possession of the present disclosure will appreciate how the present disclosure describes the direct-attached storage device software RAID system of the present disclosure implemented to operate with an operating system such as the WINDOWS® operating system described above. However, the inventors of the present disclosure have also developed a direct-attached storage device software RAID system that may be implemented with a hypervisor subsystem in order to allow software RAIDs to be provided using any types of direct-attached storage devices and any types of CPUs in a computing device similarly as described below, and that direct-attached storage device software RAID system is described in U.S. patent application Ser. No. 18/227,914, filed Jul. 29, 2023, the disclosure of which is incorporated herein by reference in its entirety.

Figure 3:
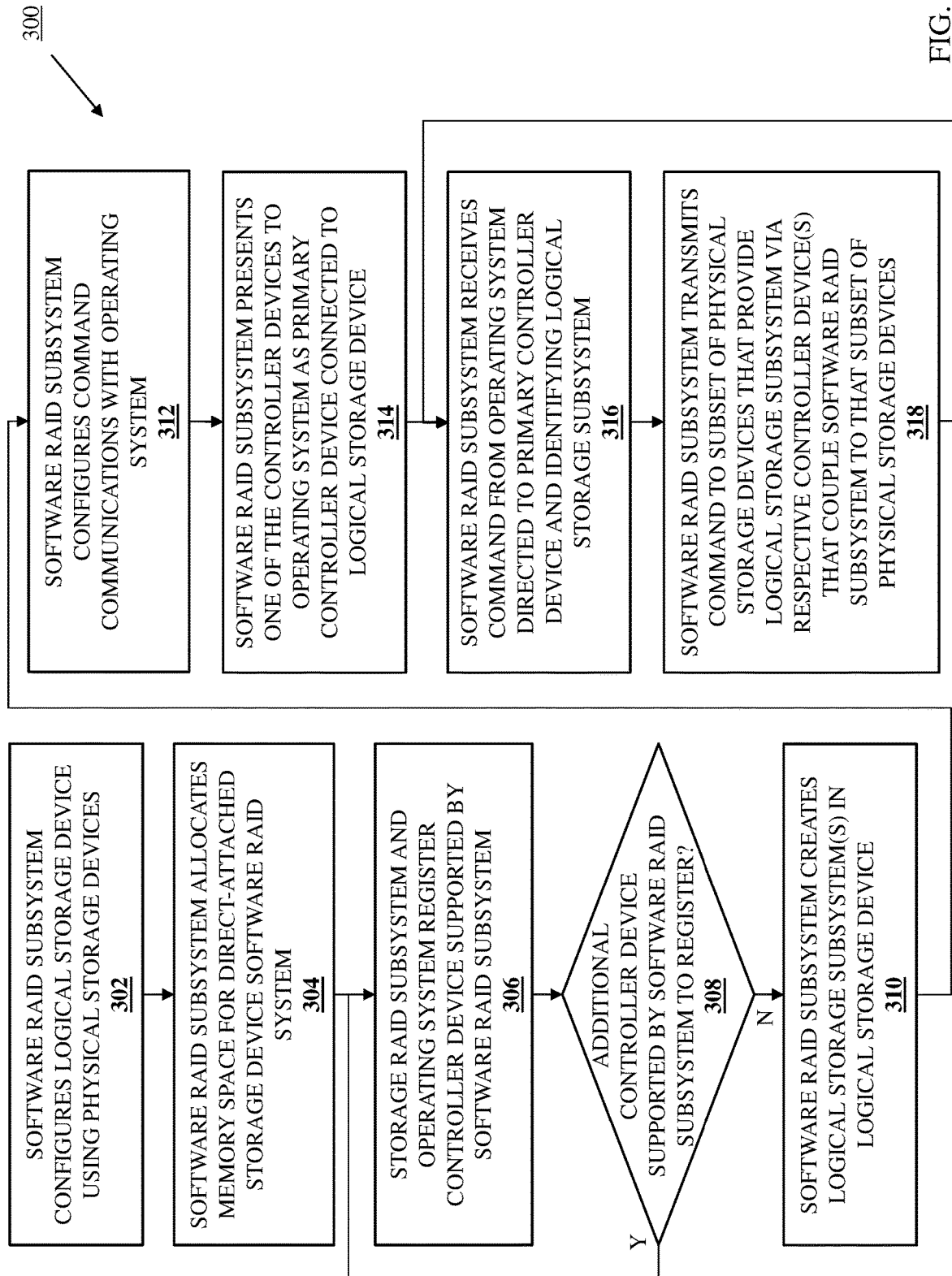
FIG. 3 is a flow chart illustrating an embodiment of a method for providing a software RAID using direct-attached storage devices in a computing device.

Referring now to FIG. 3, an embodiment of a method 300 for providing a software Redundant Array of Independent Disk (RAID) using direct-attached storage devices in a computing device is illustrated. As discussed below, the systems and methods of the present disclosure provide for the presentation by a software RAID subsystem to an operating system of a single, primary controller device as being connected to a logical storage device provided by a plurality of physical storage devices, with the software RAID subsystem receiving commands from the operating system that are directed to the primary controller device and that identify a logical storage subsystem that is included in the logical storage device, and transmitting those commands to a subset of the physical storage devices that provide that logical storage subsystem via respective controller device(s) that couple the software RAID subsystem to that subset of physical storage devices.

For example, the direct-attached storage device software RAID system of the present disclosure may include a chassis housing a software RAID subsystem coupled to physical storage devices, controller devices, and an operating system housed in the chassis. The software RAID subsystem uses the physical storage devices to provide a logical storage device to the operating system. The software RAID subsystem also presents a first controller device to the operating system as a primary controller device that is connected to the logical storage device. When the software RAID subsystem receives a command from the operating system directed to the primary controller device and identifying a logical storage subsystem in the logical storage device, it transmits the command to each of a subset of the physical storage devices that provide the logical storage subsystem in the logical storage device via a respective one of the controller devices that couples the software RAID subsystem to that physical storage device. As such, software RAIDs may be provided using any types of direct-attached storage devices and any types of CPUs in a computing device, as well as provide a variety of other benefits that would be apparent to one of skill in the art in possession of the present disclosure.

Figure 4:
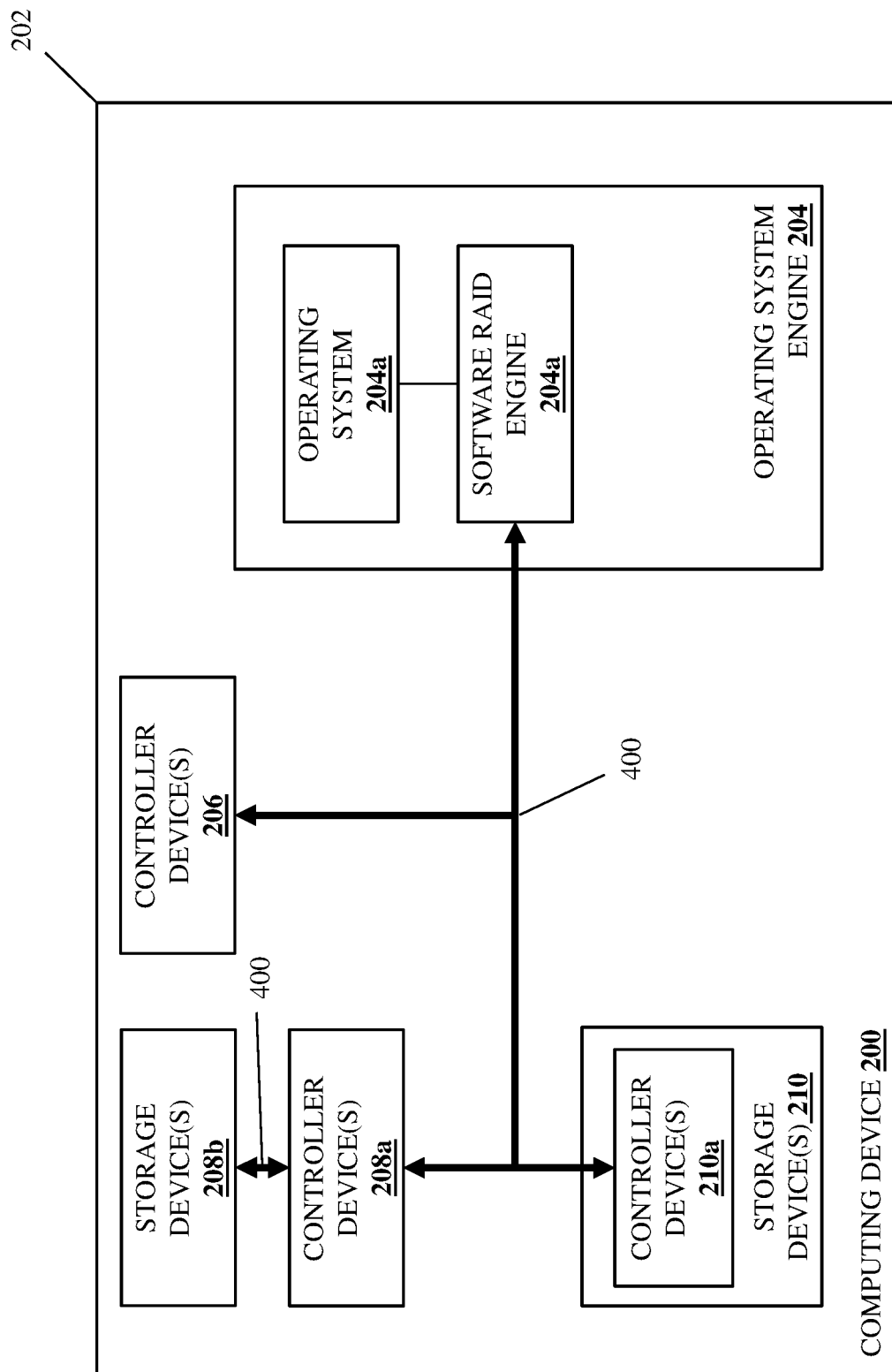
FIG. 4 is a schematic view illustrating an embodiment of the operation of the computing device of FIG. 2 during the method of FIG. 3.

The method 300 begins at block 302 where a software RAID subsystem configures a logical storage device using physical storage devices. With reference to FIG. 4, in an embodiment of block 302, the software RAID engine 204*a* in the computing device 200 may perform logical storage device configuration operations 400 that may include discovering each of the controller devices 206, 208*a*, and 210*a* and, in response, discovering each of the storage devices 208*b* and/or 210 coupled thereto, and then configuring a logical storage device using those storage devices 208*b* and/or 210. In a specific example, each of the storage device(s) 208*a* may be coupled to a PCIe controller device that is provided by one of the controller device(s) 208*a* discovered at block 302, and each of the storage device(s) 210 may include a PCIe controller device that is provided by one of the controller device(s) 210*a* discovered at block 302, while PCIe controller device(s) that are provided by the controller device(s) 206 and that are not coupled to storage devices may be discovered at block 302 as well.

For example, in response to the powering on, reset, reboot, and/or other initialization of the computing device 200, the computing device 200 may enter a pre-boot mode in which the software RAID engine 204*a* performs any of a variety of software RAID operations and/or other techniques that would be apparent to one of skill in the art in possession of the present disclosure in order to configure a RAID using the storage devices 208*a* and 210 that allows the software RAID engine 204*a* to present those storage devices 208*a* and 210 as one or more logical storage devices. As will be appreciated by one of skill in the art in possession of the present disclosure, the RAID maybe configured using the storage devices 208*a* and 210 with a variety of standard RAID levels such as a RAID0, RAID1, RAID2, RAID3, RAID4, RAID5, or RAID 6, as well as combinations of standard RAID levels (e.g., RAID 1+0, also known as RAID10), non-standard RAID levels, and/or any other RAID levels that would be apparent to one of skill in the art in possession of the present disclosure.

The method 300 then proceeds to block 304 where the software RAID subsystem allocates memory space for a direct-attached storage device software RAID system. In an embodiment, at block 304, the software RAID engine 204a in the computing device 200 may perform memory space allocation operations that may include allocating memory space for use by the direct-attached storage device software RAID system of the present disclosure. For example, the memory space allocation operations performed by the software RAID engine 204a may include allocating a memory space or other portion of the memory system that is used to provide the operating system engine 204 (e.g., operating system kernel memory) for use by the software RAID engine 204a to perform any of the direct-attached storage device software RAID operations or other functionality discussed below. As will be appreciated by one of skill in the art in possession of the present disclosure, the memory space or other portion of the memory system allocated for use by the direct-attached storage device software RAID system may be referred to a "non-cached/non-coherent memory" that may be dynamically allocated during initialization of the computing device 200 to the software RAID driver provided by the software RAID engine 204a (e.g., unlike memory space allocated to stacks), and one of skill in the art in possession of the present disclosure will recognize how the non-cached/non-coherent memory may be utilized to perform any of the functionality described below.

In a specific example, the allocation of the non-cached/non-coherent memory to the software RAID engine 204a may be performed during module initialization operations that are performed when the operating system 204b provided by the operating system engine 204 is loaded and calls those module initialization operations, and the software RAID engine 204a may allocate the non-cached/non-coherent memory based on a number of storage devices (e.g., a maximum number of storage devices) that the software RAID engine 204a is configured to support. However, while a specific example of the allocation of memory space for use by the direct-attached storage device software RAID system of the present disclosure has been described, one of skill in the art in possession of the present disclosure will appreciate how memory space may be allocated for use by the direct-attached storage device software RAID system using a variety of techniques that will fall within the scope of the present disclosure as well.

Figure 5:
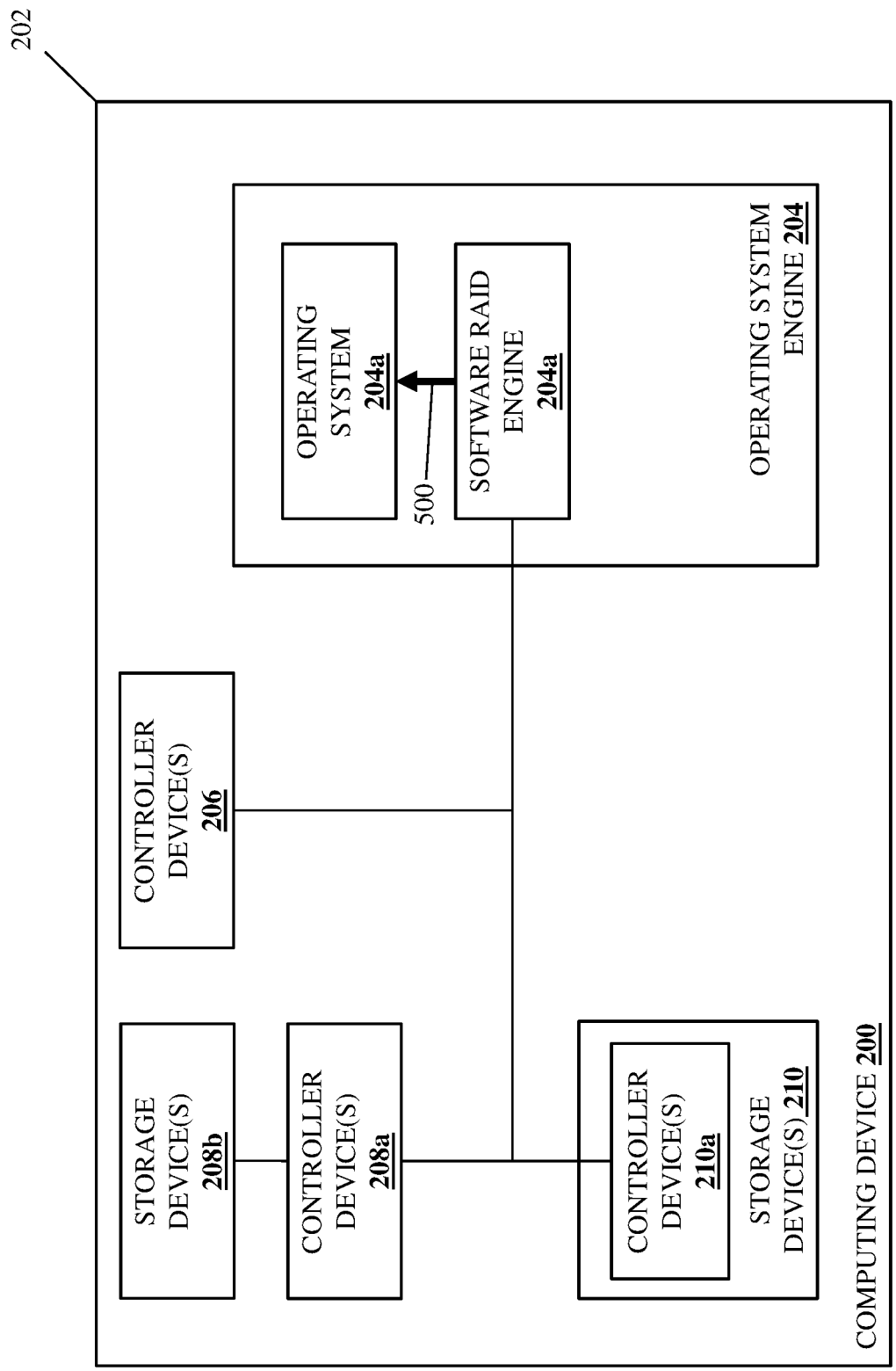
FIG. 5 is a schematic view illustrating an embodiment of the operation of the computing device of FIG. 2 during the method of FIG. 3.

The method 300 then proceeds to block 306 where the software RAID subsystem and the operating system register a controller device supported by the software RAID subsystem. With reference to FIG. 5, in an embodiment of block 306, the controller device registration operations may include the software RAID engine 204a in the computing device 200 performing supported controller device identification operations 500 that may include identifying controller devices that are supported by the software RAID engine 204a to the operating system 204b in the computing device 200 (e.g., using miniport driver commands). For example, any of the controller devices 206, 208a, and/or 210a discovered at block 302 as discussed above may be identified to the operating system 204b as supported controller devices at block 306. In a specific example, at block 306, the software RAID engine 204a may generate a Peripheral Component Interconnect (PCI) IDentification (PCIID) file that identifies the PCIe controller devices that are supported by the software RAID engine 204a, and may load or otherwise transmit that PCIID file to the operating system 204b. However, while a specific example of the identification of controller devices to the operating system 204b that are supported by the software RAID engine 204a has been described, one of skill in the art in possession of the present disclosure will appreciate how the software RAID engine 204a may identify supported controller devices to the operating system 204b using other techniques that will fall within the scope of the present disclosure as well.

Figure 6A:
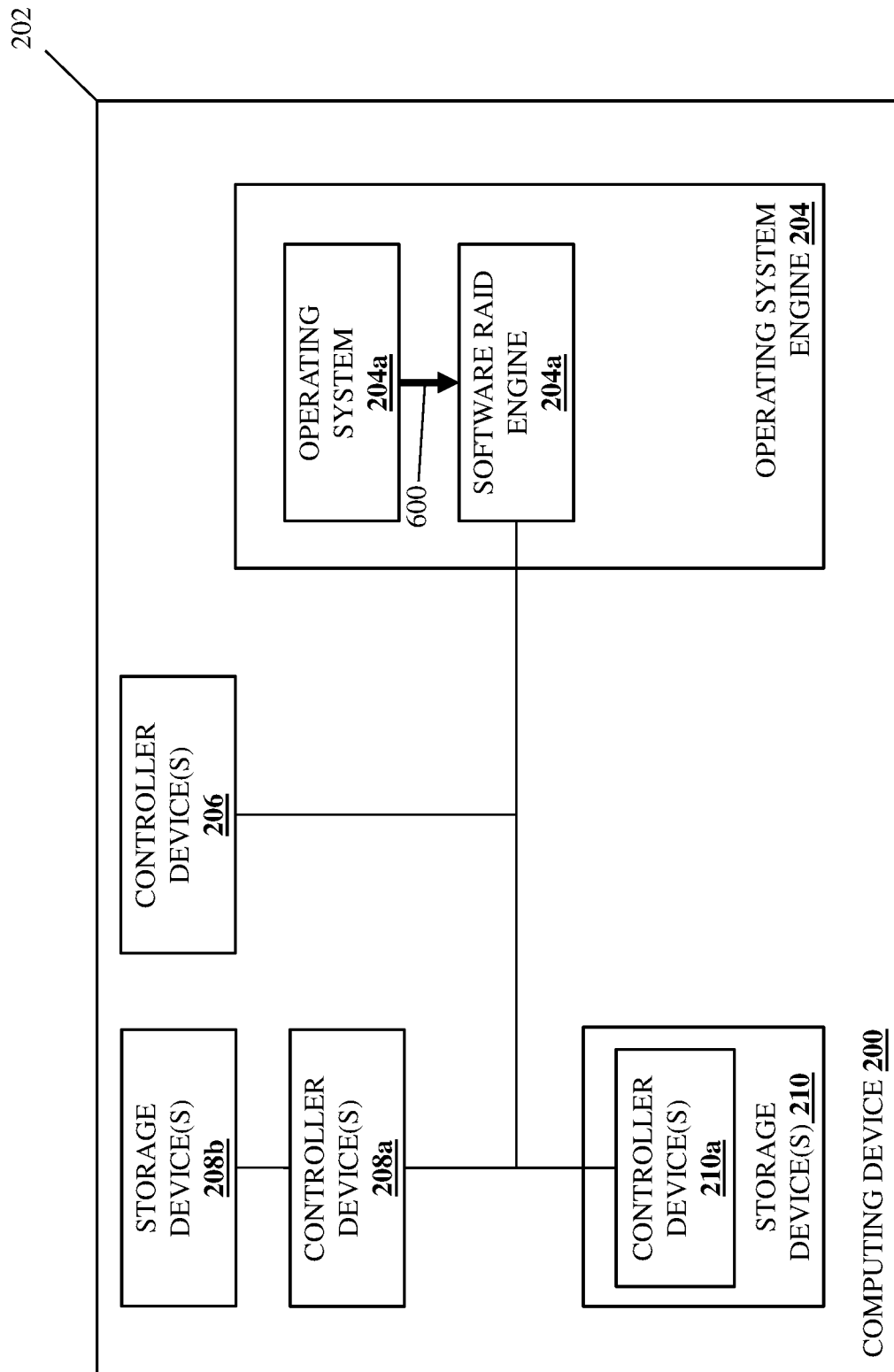
FIG. 6A is a schematic view illustrating an embodiment of the operation of the computing device of FIG. 2 during the method of FIG. 3.

With reference to FIG. 6A, in an embodiment of block 306, the controller device registration operations may also include the operating system 204b in the computing device 200 performing controller device attachment request operations 600 that may include the operating system 204b generating and transmitting a controller device attachment request for one of the controller devices that was identified as being supported by the software RAID engine 204a. For example, the operating system 204b may generate and transmit a "Find Adapter" call that provides the controller device attachment request and that one of skill in the art in possession of the present disclosure will recognize provides an instruction to the software RAID engine to find and attach one of the controller devices that was identified as being supported (e.g., via a Storport layer). However, while a specific example of a controller device attachment request has been described, one of skill in the art in possession of the present disclosure will appreciate how the operating system 204b may request the initialization and discovery of controller devices using other techniques that will fall within the scope of the present disclosure as well.

Figure 6B:
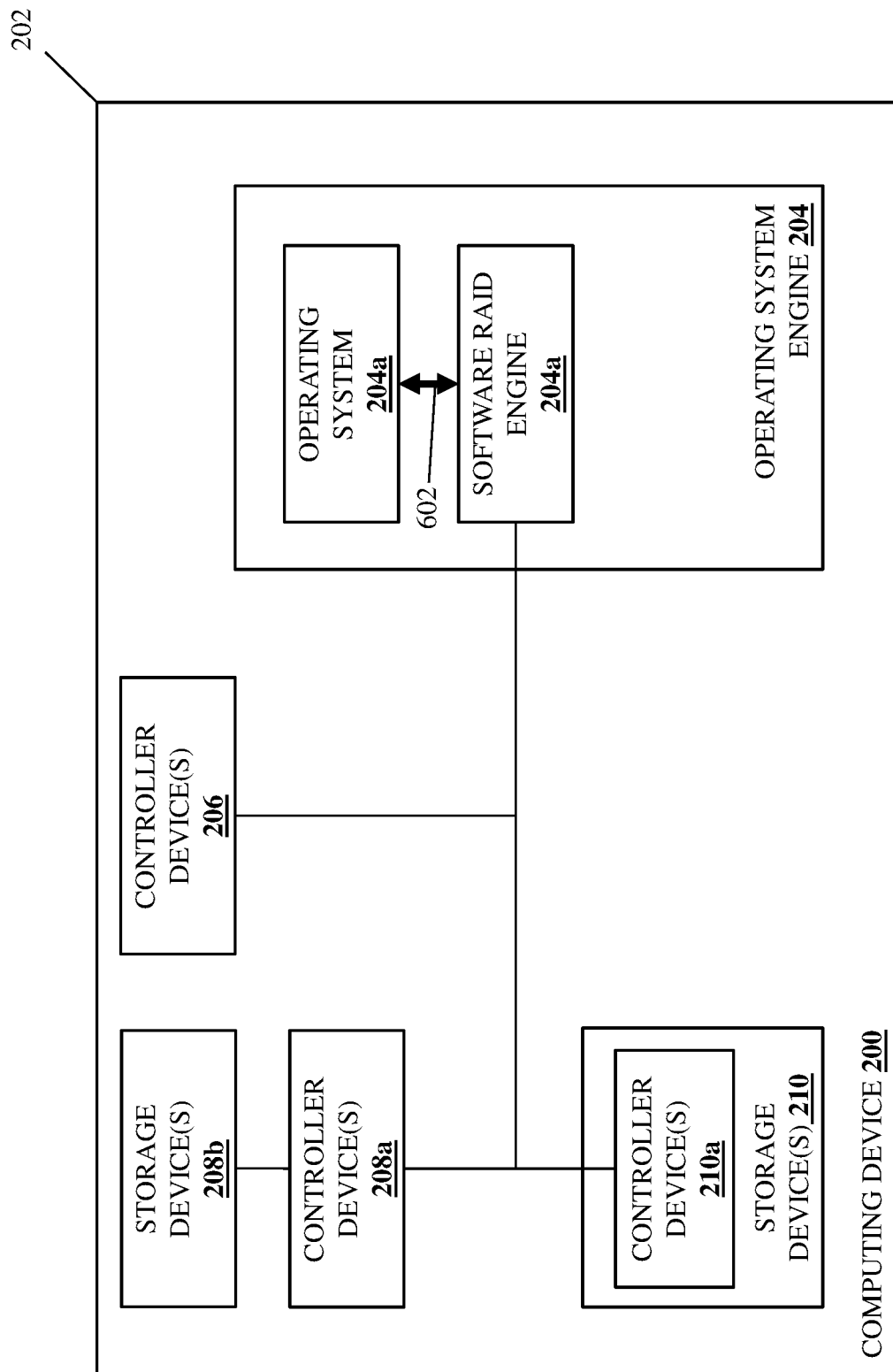
FIG. 6B is a schematic view illustrating an embodiment of the operation of the computing device of FIG. 2 during the method of FIG. 3.

With reference to FIG. 6B, in an embodiment of block 306 and in response to receiving the controller device attachment request (e.g., the "FindAdapter" call), the controller device registration operations may also include the software RAID engine 204a and the operating system 204b in the computing device 200 performing controller device attachment operations 602 that may include the software RAID engine 204a processing the controller device attachment request, attaching a corresponding controller device, and confirming the completion of the controller device attachment request that was received from the operating system 204b. For example, in response to the successful attachment of a connected controller device and its corresponding storage device(s), the software RAID engine 204a may confirm the attachment request to the operating system 204b (e.g., via a "Find Adapter call success" communication transmitted to the operating system 204b). While not illustrated or discussed in detail, one of skill in the art in possession of the present disclosure will appreciate how the software RAID engine 204a may identify to the operating system 204b any failures of the attachment of any connected controller devices and its corresponding storage device(s) as well. In response to receiving the confirmation of the controller device attachment request (e.g., the "Find Adapter call success" communication), the controller device attachment operations 602 may include the operating system 204b generating and transmitting an initialization and discovery request (e.g., a "HwInitialize" call) to the software RAID engine 204a.

With reference to FIG. 6C, in an embodiment of block 306 and in response to receiving the initialization and discovery request from the operating system 204b, the controller device registration operations may also include the software RAID engine 204a in the computing device 200 performing initialization and discovery operations 604 that may include, in the specific example provided in FIG. 6C, the software RAID engine 204a initializing and discovering the one of the controller device(s) 206 identified by the operating system 204b in the controller device attachment request. As will be appreciated by one of skill in the art in possession of the present disclosure, the initialization and discovery operations 604 performed by the software RAID engine 204a may include any of a variety of initialization operations and discovery operations that would be apparent to one of skill in the art in possession of the present disclosure, that may depend on the protocol supported by that controller device (e.g., a SAS protocol, a SATA protocol, an NVMe protocol, etc.), and that result in the registration of that controller device 206 with the operating system 204b.

In some embodiments, following the initialization and discovery of the first controller device during the first iteration of block 306, the software RAID engine 204a in the computing device 200 may perform timer registration operations that may include registering a timer with the operating system 204b. As discussed below, some embodiments of the present disclosure may include the utilization of a timer to determine when the last controller device has been registered as part of the controller device registration operations performed across one or more iterations of block 306 of the method 300, and thus that timer may be registered by the software RAID engine 204a with the operating system 204b at block 306 using any of a variety of timer registration techniques that would be apparent to one of skill in the art in possession of the present disclosure. However, the registration of the timer is described as occurring at a particular point in method 300 (e.g., following initialization and discovery of the first controller device during the first iteration of block 306), one of skill in the art in possession of the present disclosure will appreciate how the timer may be registered at other points in the method 300 while remaining within the scope of the present disclosure as well. Furthermore, and as discussed in further details below, other embodiments of the method 300 may utilize other techniques to determine when the last controller device has been registered as part of the controller device registration operations across one or more iterations of block 306 of the method 300, and thus the timer registration operations may be skipped in those embodiments.

The method 300 then proceeds to decision block 308 where it is determined whether there is an additional controller device supported by the software RAID subsystem to register. In some embodiments of decision block 308, following the registration of the one of the controller device(s) 206 (in the specific example provided in FIG. 6B) in the operating system 204b at block 306, the software RAID engine 204a in the computing device 200 may perform timer activation operations in order to activate the timer discussed above that may have been registered with the operating system 204b in some embodiments of the present disclosure. The software RAID engine 204a may then monitor that timer at decision block 308 to determine whether another controller device attachment request (e.g., the "FindAdapter" call in the specific example provided above) for another of the controller devices 206, 208b, and/or 210a is received from the operating system 204b within a threshold time period. As will be appreciated by one of skill in the art in possession of the present disclosure, the software RAID engine 204a may utilize any of a variety of threshold time periods that, after which, the software RAID engine 204a may assume that no further controller device attachment requests will be received (i.e., that there are no further controller devices to be registered with the operating system 204b).

However, while the use of a timer and threshold time period following registration of any particular controller device in order to determine whether there are any other controller devices to register at decision block 308 has been described, as discussed above other techniques for determining whether there are any other controller devices to register at decision block 308 will fall within the scope of the present disclosure as well. For example, other embodiments of the present disclosure may provide a software driver in the computing device 200 that is configured to identify a number of available controller devices in the computing device 200, and then transmit that number of available controller devices to the software RAID engine 204a for use in determining at decision block 308 whether the number of controller devices registered with the operating system 204a has reached that number of available controller devices. As such, the determination of whether there are any other controller devices to register in the operating system 204b during decision block 308 of the method 300 may be performed in a variety of manners while remaining within the scope of the present disclosure.

If, at decision block 308, it is determined that there is an additional controller device supported by the software RAID subsystem to register, the method 300 returns to block 306. As such, the method 300 may loop such that the software RAID engine 204a and the operating system 204b in the computing device 200 operate to register any additional controller device with the operating system 204b. Thus, different iterations of block 306 and decision block 308 may cause the software RAID engine 204a and the operating system 204b to register each of the controller devices in the computing device 200 in the operating system 204b. For example, for any remaining controller devices 206, 208a, and 210a, the controller device attachment request operations 600, controller device attachment operations 602, and initialization and discovery operations 604 described above for block 306 may be performed for that controller device, and block 306 may repeat until it is determined that there are no additional controller devices to register with the operating system 204b.

Figure 7:
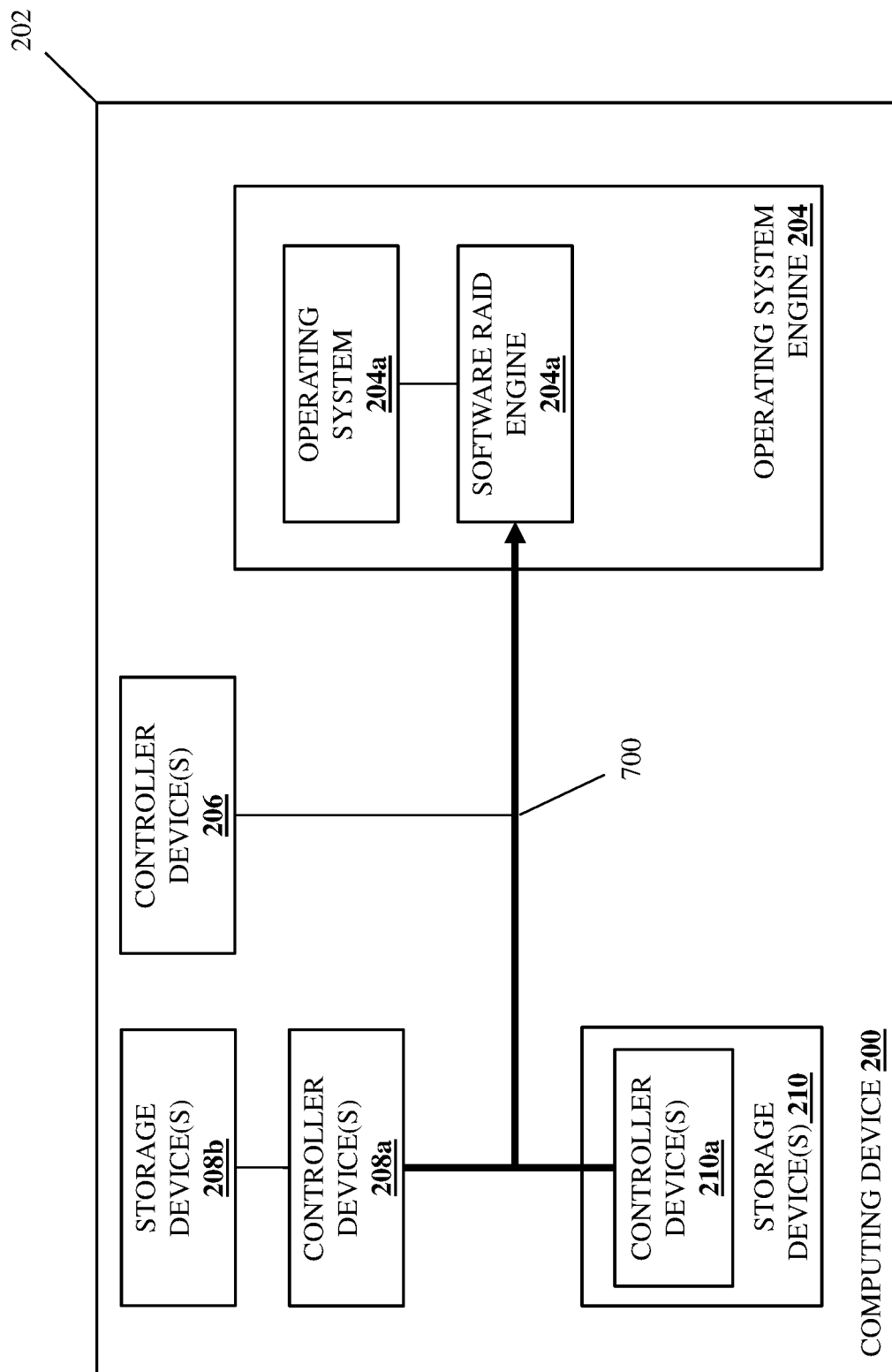
FIG. 7 is a schematic view illustrating an embodiment of the operation of the computing device of FIG. 2 during the method of FIG. 3.

If, at decision block 308, it is determined that there are no additional controller devices supported by the software RAID subsystem to register, the method 300 proceeds to block 310 where the software RAID subsystem creates one or more logical storage subsystems in the logical storage device. In an embodiment, at block 310 and in response to determining that there are no additional controller devices to register with the operating system 204b, the software RAID engine 204a in the computing device 200 may perform logical storage subsystem creation operations that may include creating one or more logical storage subsystems in the logical storage device provided by the storage devices 208b and 210. For example, with reference to FIG. 7, in some embodiments the logical storage subsystem creation operations may include the software RAID engine 204a performing metadata retrieval operations 700 that may include retrieving metadata from the controller devices 208a and 210a coupled to each of the storage devices 208b and 210 that are being used to provide the logical storage device.

As will be appreciated by one of skill in the art in possession of the present disclosure, the metadata retrieved from the controller devices 208a and 210a coupled to each of the storage devices 208b and 210 may identify one or more logical storage subsystems (e.g., virtual disks, RAID volumes, RAID Logical Unit Numbers (LUNs), and/or logical storage subsystems known in the art) that will be provided by each of the storage devices 208b and 210, as well as any other information that one of skill in the art in possession of the present disclosure would recognize as providing for the creation of the logical storage subsystems in the logical storage device. As such, at block 310, the logical storage subsystem creation operations performed by the software RAID engine 204a may include using the metadata retrieved from the controller devices 208a and 210a coupled to each of the storage devices 208b and 210 to "build", generate, and/or otherwise create one or more logical storage subsystems (e.g., virtual disks, RAID volumes, RAID LUNs, and/or logical storage subsystems known in the art) in the logical storage device that is provided by the storage devices 208b and 210. However, while a specific example of the creation of logical storage subsystem(s) in a logical storage device has been described, one of skill in the art in possession of the present disclosure will appreciate how the logical storage subsystems may be created in the logical storage device using a variety of techniques that will fall within the scope of the present disclosure as well.

Figure 8:
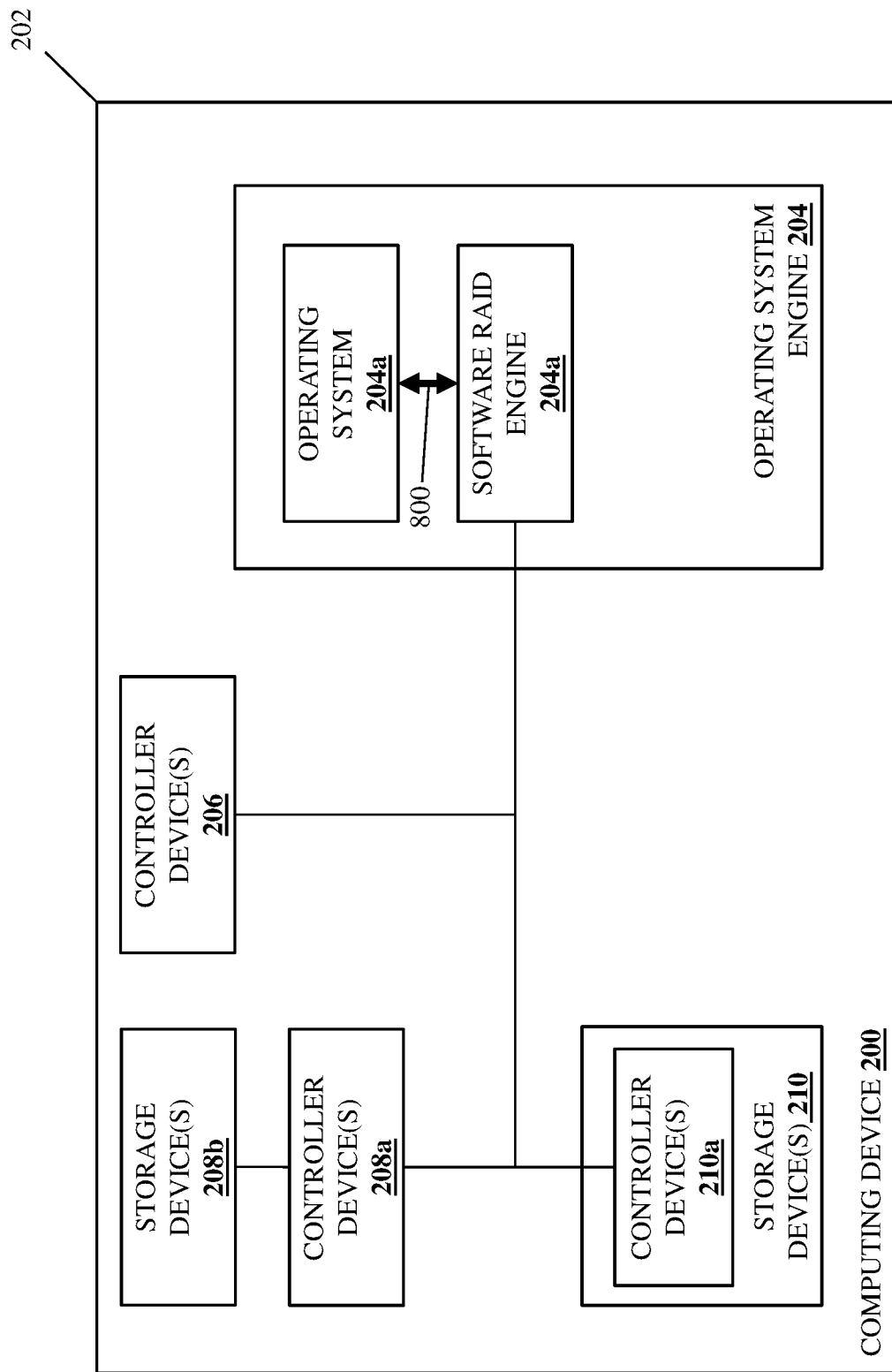
FIG. 8 is a schematic view illustrating an embodiment of the operation of the computing device of FIG. 2 during the method of FIG. 3.

The method 300 then proceeds to block 312 where the software RAID subsystem configures command communications with the operating system. With reference to FIG. 8, in an embodiment of block 312, the software RAID engine 204a in the computing device 200 may perform command communication configuration operations 800 that may include identifying a primary controller device from the plurality of controller devices 206, 208a, and 210a. For example, the controller device 206, 208a, or 210a identified as the primary controller device at block 312 may be a PCIe controller device that may have been designated by a computing device manufacturer to operate as the primary controller device based on that PCIe controller device being common to a variety of different configurations of computing devices provided by the computing device manufacturer (and thus being present in each of those computing devices/ computing device configurations if needed to implement the direct-attached storage device software RAID system of the present disclosure). In another example, the controller device 206, 208a, or 210a identified as the primary controller device at block 312 may be a PCIe controller device that is not configured to be "hot removed" from the computing device 200. However, while a few specific examples of controller devices that may be identified as primary controller devices have been described, one of skill in the art in possession of the present disclosure will appreciate how any of a variety of criteria may be used to designate the controller device that may be identified as the primary controller device at block 312 while remaining within the scope of the present disclosure as well.

Following the command configuration operations at block 312, the direct-attached storage device software RAID system completes initialization such that the RAID volume provided by the logical storage device is configured for use, and one of skill in the art in possession of the present disclosure will appreciate how a full RAID volume or partial RAID volume may be configured via the method 300 as described above, and may be used for runtime data, during boot/initialization, and/or for other RAID volume uses that would be apparent to one of skill in the art in possession of the present disclosure.

Figure 9:
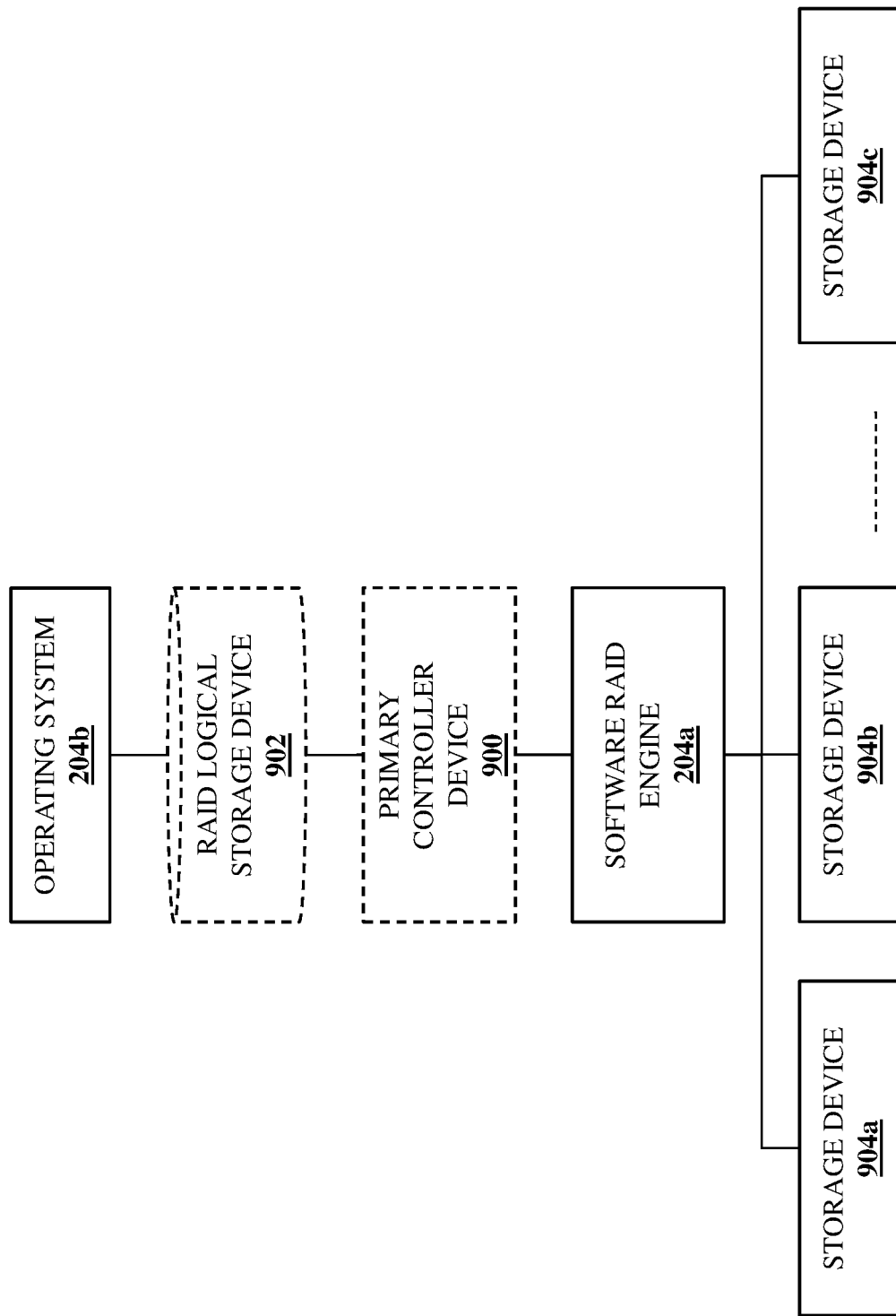
FIG. 9 is a schematic view illustrating an embodiment of the operation of the computing device of FIG. 2 during the method of FIG. 3.

The method 300 then proceeds to block 314 where the software RAID subsystem presents one of the controller devices to the operating system as a primary controller device that is connected to the logical storage device. With reference to FIG. 9, in an embodiment of block 314 and following the completion of the initialization of the direct-attached storage device software RAID system, the software RAID engine 204a may present, to the operating system 204b in the computing device 200, a primary controller device 900 (which as discussed above is provided by one of the controller devices 206, 208a, or 210a) as being connected to a RAID logical storage device 902 that is provided using a plurality of physical storage devices 904a, 904b, and up to 904c (which may be any of the storage devices 208a and 210 registered with the operating system 204b as discussed above).

To provide a specific example, one of the controller device(s) 206 that is not connected to a storage device may be presented to the operating system 204b as being connected to the RAID logical storage device 902, although one of skill in the art in possession of the present disclosure will appreciate how any one of the controller devices 208a or 210a may be presented to the operating system 204b as being connected to the RAID logical storage device 902 while remaining within the scope of the present disclosure as well. As will be appreciated by one of skill in the art in possession of the present disclosure, any of the controller devices 206, 208a, and 210a that are not presented to the operating system 204b as being connected to the RAID logical storage device 902 may instead be presented to the operating system 204b as secondary controller devices that are not connected to the RAID logical storage device 902 or any of the storage devices 904a-904c (i.e., despite at least some of those controller devices being physically connected to those storage devices 904a-904c).

As such, each of the logical storage subsystems (e.g., virtual disks, RAID volumes, RAID LUNs, and/or logical storage subsystems known in the art) provided by the RAID logical storage device 902 are exposed to the operating system 204b via the primary controller device 900. Thus, using some of the specific examples discussed above, each of the logical storage subsystems (e.g., virtual disks, RAID volumes, RAID LUNs, and/or logical storage subsystems known in the art) provided by storage devices 904a-904b may be presented to a user of the operating system provided by the operating system engine 204 as SCSI storage devices or otherwise being provided by SCSI storage devices.

Figure 10:
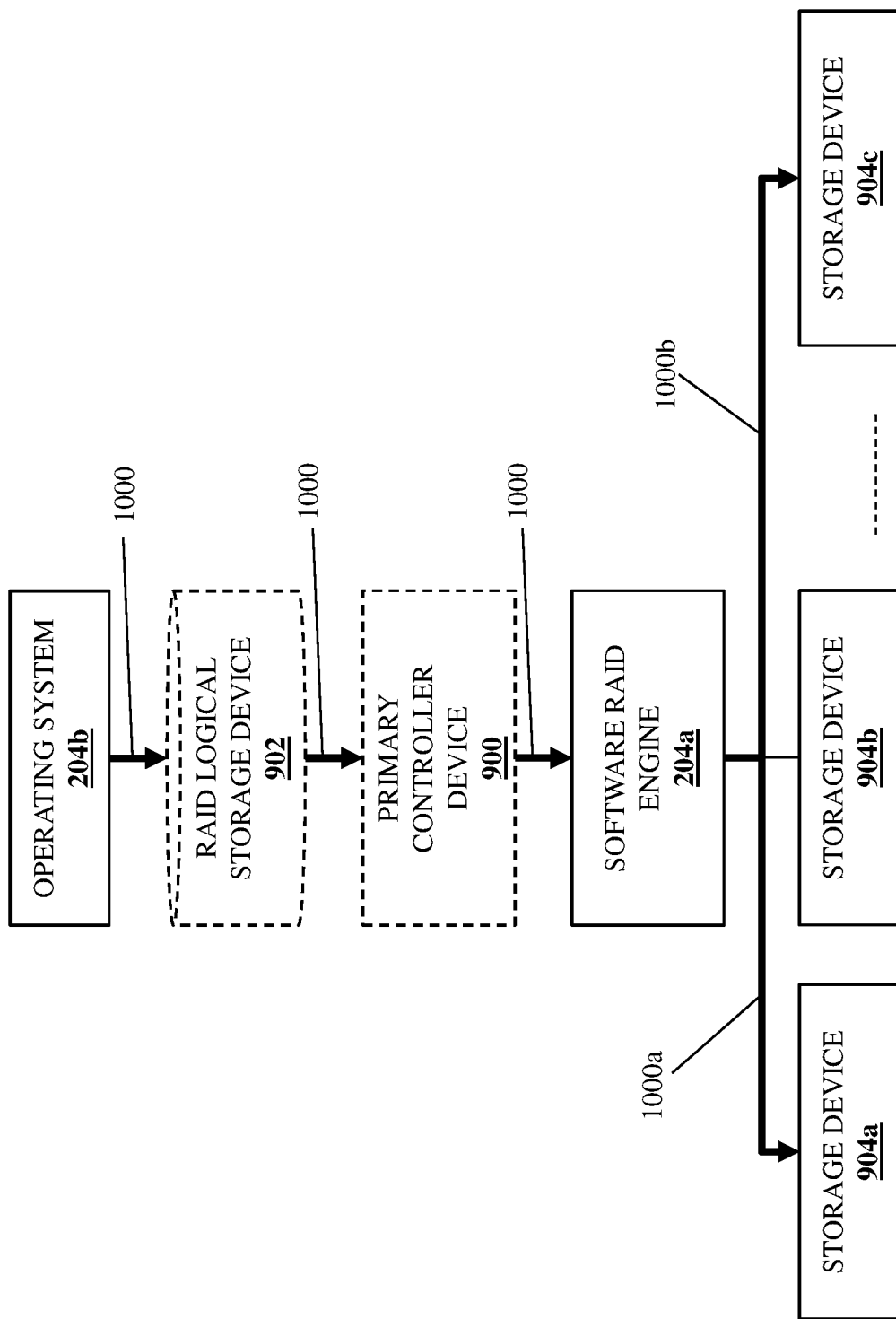
FIG. 10 is a schematic view illustrating an embodiment of the operation of the computing device of FIG. 2 during the method of FIG. 3.

The method 300 then proceeds to block 316 where the software RAID subsystem receives a command from the operating system that is directed to a primary controller device and that identifies a logical storage subsystem. With reference to FIG. 10, in an embodiment of block 316, the operating system 204b in the computing device 200 may perform command provisioning operations 1000 that include generating a command that identifies a logical storage subsystem provided by the RAID logical storage device 902, and transmitting that command to the primary controller device 900 that is presented as being connected to the RAID logical storage device 902, which one of skill in the art in possession of the present disclosure will appreciate will result that in that command being received by the software RAID engine 204a in the computing device 200. In an embodiment, the command transmitted by the operating system 204b to the software RAID engine 204a may include I/O commands such as a read command, a write command, and/or any other RAID commands that would be apparent to one of skill in the art in possession of the present disclosure.

Using the specific example provided above in which the software RAID engine 204a is provided by a SCSI-based driver, any commands received at block 316 by the software RAID engine 204a from the operating system 204b may be SCSI commands. Furthermore, as discussed in some of the specific examples above, the commands received at block 316 by the software RAID engine 204a from the operating system 204b may be mapped to protocol queues in the operating system 204b that are used to communicate with the software RAID engine 204a provided by the SCSI-based driver, and thus the software RAID engine 206a may receive those commands via the accessing of those protocols queues.

The method 300 then proceeds to block 318 where the software RAID subsystem transmits the command to a subset of physical storage devices that provide the logical storage subsystem via respective controller device(s) that couple the software RAID subsystem to that subset of physical storage devices. With continued reference to FIG. 10, in an embodiment of block 318, the software RAID engine 204a may perform command transmission operations 1000a and 1000b that, in the specific example illustrated in FIG. 10, includes transmitting the command received at block 316 to the storage device 904a and the storage device 904c via their respective controller device(s) (e.g., any of the controller device(s) 208a and 210a) based on those storage devices 904a and 904c providing the logical storage subsystem identified in the command received by the software RAID engine 204a from the operating system 204b. As will be appreciated by one of skill in the art in possession of the present disclosure, the commands 1000a and 1000b transmitted to the storage devices 904a and 904c may be provided by modified versions of the command 1000 received from the operating system 204b (e.g., SCSI commands received from the operating system 204b may be translated to a protocol supported by the controller device/storage device to which it is transmitted).

For example, in response to receiving the command from the operating system 204b in the computing device 200, the software RAID engine 204a in the computing device 200 may determine which of the storage devices 904a-904c provide the logical storage subsystem identified in that command (e.g., the storage devices 904a and 904c in this specific example). As discussed above, in some specific examples, protocol queues in the operating system 204b may be mapped to SAS, SATA, and/or NVMe protocol queues in the software RAID engine 204a, and thus the software RAID engine 204a may provide any commands received from the operating system 204b in the protocol queues associated with the protocol utilized by the storage devices that provide the logical storage subsystem to which those commands are directed. As such, the command received by the software RAID engine 204a from the operating system 204b may be placed in a protocol queue associated with the protocol used by the storage device 904a, as well as in a protocol queue associated with the protocol used by the storage device 904c.

In embodiments in which the software RAID engine 204a is provided by a SCSI-based driver and the commands received from the operating system 204b are SCSI commands, in the event the storage devices 904a and/or 904c are SAS storage devices or otherwise use the SAS protocol, SCSI commands may be placed in a SAS protocol queue in the software RAID engine 204a and then transmitted to the storage devices 904a and/or 904c via their respective controller device(s) (e.g., any of the controller device(s) 208a and 210a). However, in the event the storage devices 904a and/or 904c are SATA storage devices or otherwise use the SATA protocol, SCSI commands may be placed in a SATA protocol queue in the software RAID engine 204a, translated using a SCSI translation layer in the software RAID engine 204a (e.g., a SCSI-to-Frame Information Structure (FIS) translation), and then transmitted to the storage devices 904a and/or 904c via their respective controller device(s) (e.g., any of the controller device(s) 208a and 210a). Similarly, in the event the storage devices 904a and/or 904c are NVMe storage devices or otherwise use the NVMe protocol, SCSI commands may be placed in an NVMe protocol queue in the software RAID engine 204a, translated using a SCSI translation layer in the software RAID engine 204a (e.g., a SCSI-to-NVMe translation), and then transmitted to the storage devices 904a and/or 904c via their respective controller device(s) (e.g., any of the controller device(s) 208a and 210a).

However, while a few specific examples of the translation of commands received from the operating system 204b before providing them to the storage devices 904a-904c via their respective controller devices have been described, one of skill in the art in possession of the present disclosure will appreciate that other command translations may be performed while remaining within the scope of the present disclosure as well. For example, one of skill in the art in possession of the present disclosure will appreciate how a PCIe controller device connected to a SAS controller device will operate as a SAS controller that utilizes the SAS protocol, and thus no command translations may be needed in such situations. Similarly, a PCIe controller device connected to a SATA controller device will operate as a SATA controller that utilizes the SATA protocol, and thus SCSI-to-FIS translations may be needed in such situations.

The method 300 then returns to block 316. As such, the method 300 may loop such that the software RAID engine 204a in the computing device 200 receives commands from the operating system 204b in the computing device 200 and transmits those commands to the storage devices 904a-904c via their respective controllers as long as the storage devices 904a-904c are being used to provide the RAID logical storage device 902 to the operating system 204b. While not described in detail herein, in the event the storage devices 904a-904c will no longer be used to provide the RAID logical storage device 902 to the operating system 204b, the software RAID engine 204a may disconnect the controller device(s) 206, 208a, and 210a from the operating system 204b, as well as perform any other operations that would be apparent to one of skill in the art in possession of the present disclosure.

Thus, systems and methods have been described that provide for the presentation by a SCSI-based software RAID driver to an operating system of a single, primary PCIe controller device as being connected to a RAID logical storage device provided by a plurality of SAS, SATA, and/or NVMe physical storage devices, with the SCSI-based software RAID driver receiving I/O commands from the operating system that are directed to the primary PCIe controller device and that identify a RAID logical storage subsystem that is included in the RAID logical storage device, and transmitting those commands to a subset of the SAS, SATA, and/or NVMe physical storage devices that provide that RAID logical storage subsystem via respective PCIe controller device(s) that couple the SCSI-based software RAID driver to that subset of SAS, SATA, and/or NVMe physical storage devices. As such, software RAID support in operating systems like the WINDOWS® operating system discussed above is enabled in direct-attached storage device configurations for any types of storage devices and any types of CPUs, thus allowing the creation of a RAID using any available storage devices in a variety of computing devices. As such, RAID systems may be configured from a larger variety of storage devices and using spanned PCIe controllers, addressing several issues with the conventional RAID systems discussed above.

However, while the method 300 provides for the runtime presentation by the software RAID subsystem to the operating system of a single, primary controller device as being connected to the logical storage device provided by the plurality of physical storage devices, in order to boot or otherwise initialize that operating system from the logical storage device, the Basic Input/Output System (BIOS) in the computing device 200 (e.g., a Unified Extensible Firmware Interface (UEFI) in the BIOS) will require that the primary controller expose the logical storage device to it in a similar manner. For example, and as will be appreciated by one of skill in the art in possession of the present disclosure, the UEFI provides boot support for both RAID and non-RAID storage systems via the use of "supported", "start", and "stop" callbacks that enable booting via supported Peripheral Component Interconnect express (PCIe) device(s) (e.g., PCIe endpoint devices such as NVMe storage devices). To provide a specific example, the UEFI may call "inbox" or "preinstalled" UEFI drivers (as opposed to "outside" or "third-party" UEFI drivers like the software RAID drivers described herein that may be added to the UEFI by a third party vendor) using a respective "supported" callback for each PCIe device, with those UEFI drivers then accessing a vendor identifier and device identifier of that PCIe device to determine whether that PCIe device is supported (and returning a "success" communication if so). In response to a UEFI driver supporting a PCIe device, the UEFI will provide the "start" callback to that UEFI driver that causes that UEFI driver to "claim" or "attach to" that PCIe device in order to allow it to be used for booting, while the "stop" callback is used to "unload" PCIe device from a UEFI driver that previously claimed it.

As such, in conventional computing devices, PCIe endpoint devices such as the NVMe storage devices discussed above will be claimed by inbox/preinstalled UEFI drivers in the manner described above, while the software RAID drivers described herein will use passthrough techniques (e.g., via PCIe device handles or other identifiers retrieved from the UEFI) to communicate with the NVMe storage devices via those inbox/preinstalled UEFI drivers in order to perform read and/or write operations (e.g., via submission of reads and/or writes for an NVMe storage device to the inbox/preinstalled UEFI driver that claimed that NVMe storage device).

As will be appreciated by one of skill in the art in possession of the present disclosure, a UEFI software RAID driver provided by the software RAID engine 204a discussed above may enable RAID volume creation (e.g., via a Human Interface Infrastructure (HII)), may install a block Input/Output (IO) protocol on any RAID volumes created as described above, and may expose those RAID volumes to the UEFI via a dedicated "primary" controller device as per the method 300 described above in order to enable booting of the operating system via those RAID volumes. However, in situations where a native controller device such as an Advanced Host Configuration Interface (AHCI) controller device is not present in the computing device 200, the controller devices included in the PCIe endpoint devices like the NVMe storage devices may all be claimed by the inbox/preinstalled UEFI drivers as discussed above, and thus will not be available for use in exposing the RAID volumes to the UEFI for use in booting the operating system in the computing device. Furthermore, while issues associated with booting an operating system via the software RAID are described above, one of skill in the art in possession of the present disclosure will appreciate how similar issues exist with booting the hypervisor subsystem referenced above as well.

Figure 11:
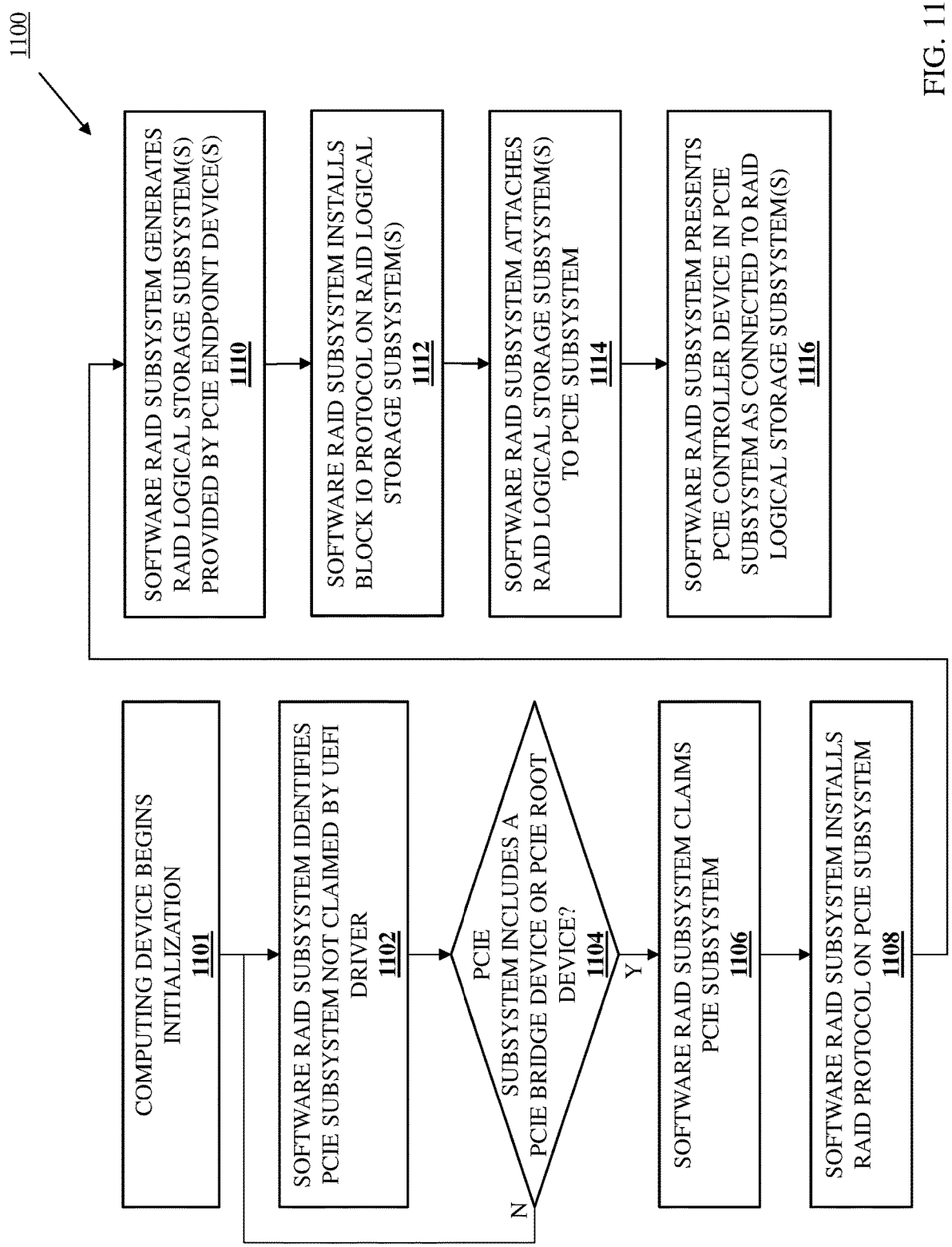
FIG. 11 is a flow chart illustrating an embodiment of a method for booting via a direct-attached storage device software RAID.

With reference to FIG. 11, an embodiment of a method 1100 for booting via a direct-attached storage device software RAID is illustrated. As discussed below, the systems and methods of the present disclosure identify an unclaimed PCIe bridge device or PCIe root device, and use its PCIe controller device to present RAID logical storage subsystem(s) provided by PCIe endpoint device(s) to a UEFI subsystem. For example, the direct-attached storage device software RAID boot system of the present disclosure may include a chassis housing PCIe subsystems coupled to a UEFI subsystem and a software RAID subsystem. The software RAID subsystem identifies a first PCIe subsystem that is not claimed by a UEFI driver provided by the UEFI subsystem, and determines that the first PCIe subsystem is one of a PCIe bridge device or a PCIe root device. In response, the software RAID subsystem claims the first PCIe subsystem, installs a RAID protocol on the first PCIe subsystem, attaches at least one RAID logical storage subsystem provided by at least one PCIe endpoint device in the PCIe subsystems to the first PCIe subsystem, and presents the UEFI subsystem with a PCIe controller device in the first PCIe subsystem as being connected to the at least RAID logical storage subsystem. As such, the UEFI subsystem in a computing device without a native controller device may boot an operating system using the RAID logical storage subsystem(s).

Figure 12:
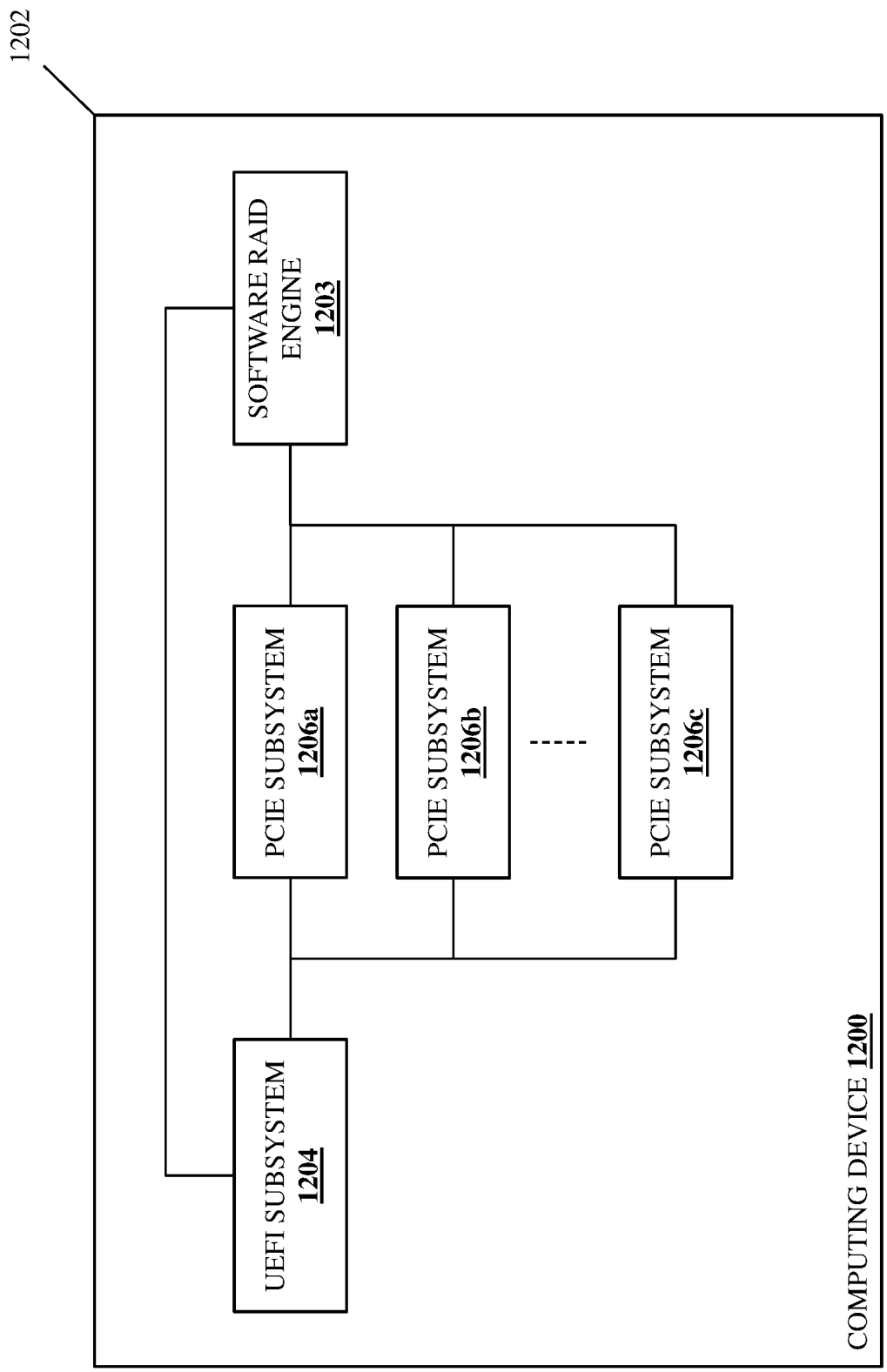
FIG. 12 is a schematic view illustrating an embodiment of the computing device of FIG. 2 that is used to describe the method of FIG. 11.

With reference to FIG. 12, an embodiment of a computing device 1200 is illustrated that may be provided by the computing device 200 of FIG. 2 and is used below to describe the method of FIG. 11. As such, the computing device 1200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 1200 discussed below may be provided by other devices that are configured to operate similarly as the computing device 1200 discussed below. In the illustrated embodiment, the computing device 1200 includes a chassis 1202 that houses the components of the computing device 1200, only some of which are illustrated and described below.

As illustrated, the chassis 1202 houses a software RAID engine 1203 that is similar to the operating system software RAID driver provided by software RAID engine 204a described above that operates during runtime of the computing device 200/1200, but that one of skill in the art in possession of the present disclosure will appreciate may be provided by a Unified Extensible Firmware Interface (UEFI) software RAID driver that operates in a UEFI environment in the computing device 200/1200). As will be appreciated by one of skill in the art in possession of the present disclosure, the UEFI software RAID driver provided by the software RAID engine 1203 may perform the method 300 discussed above in a substantially similar manner as the operating system software RAID driver provided by software RAID engine 204a, but with the exception that the UEFI software RAID driver provided by the software RAID engine 1203 will use UEFI-specific calls (e.g., "supported" UEFI calls, "start" UEFI calls, and "stop" UEFI calls).

Furthermore, the chassis 1202 may also house a UEFI processing system and a UEFI memory system (e.g., provided in UEFI firmware) that includes instructions that, when executed by the UEFI processing system, cause the UEFI processing system to provide a UEFI subsystem 1204 that is configured to perform the functionality of the UEFI subsystems described below while in the UEFI environment with the software RAID engine 1203. As illustrated, the software RAID engine 1203 may be coupled to the UEFI subsystem 1204 via any of a variety of hardware and/or software communication connections that would be apparent to one of skill in the art in possession of the present disclosure.

As will be appreciated by one of skill in the art in possession of the present disclosure, the UEFI subsystem 1204 may be part of a Basic Input/Output System (BIOS) in the computing device 1200 that is configured to perform hardware initialization during a booting process (e.g., a Power-On STartup (POST)) for the computing device 1200, as well as runtime services for the operating system 204*b* discussed above (and/or applications), with the UEFI subsystem 1204 provided by platform firmware that is used for booting and as an interface for interaction with the operating system 204*b*. However, while a specific initialization system providing for the booting operations of the computing device 1200 has been described, one of skill in the art in possession of the present disclosure will appreciate how other initialization systems will fall within the scope of the present disclosure as well.

As illustrated, the chassis 1200 also houses a plurality of PCIe subsystems 1206*a*, 1206*b*, and up to 1206*c* that are coupled to the software RAID engine 1203 and the UEFI subsystem 1204 (e.g., via a coupling between those PCIe subsystems and the processing system(s) that provide the software RAID engine 1203 and the UEFI subsystem 1204). As described below, any of the PCIe subsystems 1206*a*-1206*c* may include PCIe root devices (e.g., PCIe devices providing PCIe root ports), PCIe bridge devices, PCIe endpoint devices, and/or other PCIe devices that would be apparent to one of skill in the art in possession of the present disclosure, along with any PCIe controller devices provided for those PCIe devices. However, one of skill in the art in possession of the present disclosure will appreciate how PCIe subsystems may include other components while remaining within the scope of the present disclosure as well. As such, one of skill in the art in possession of the present disclosure will appreciate how the PCIe subsystems 1206*a*-1206*c* may include the storage devices 208*b* and/or 210 described above, the controller devices 208*a* and/or 210*a* discussed above, and/or other associated PCIe components as well. Furthermore, in some embodiments, the computing device 1200 may not include a native controller device such as the AHCI controller device or CPU VMD hardware described above (e.g., the "stand-alone" controller device 206 discussed above). However, while a specific computing device 1200 has been described, one of skill in the art in possession of the present disclosure will appreciate how the computing device 1200 may include other components and/or component configurations for providing conventional computing device functionality, as well as the direct-attached storage device software RAID booting functionality described below, while remaining within the scope of the present disclosure as well.

Figure 13A:
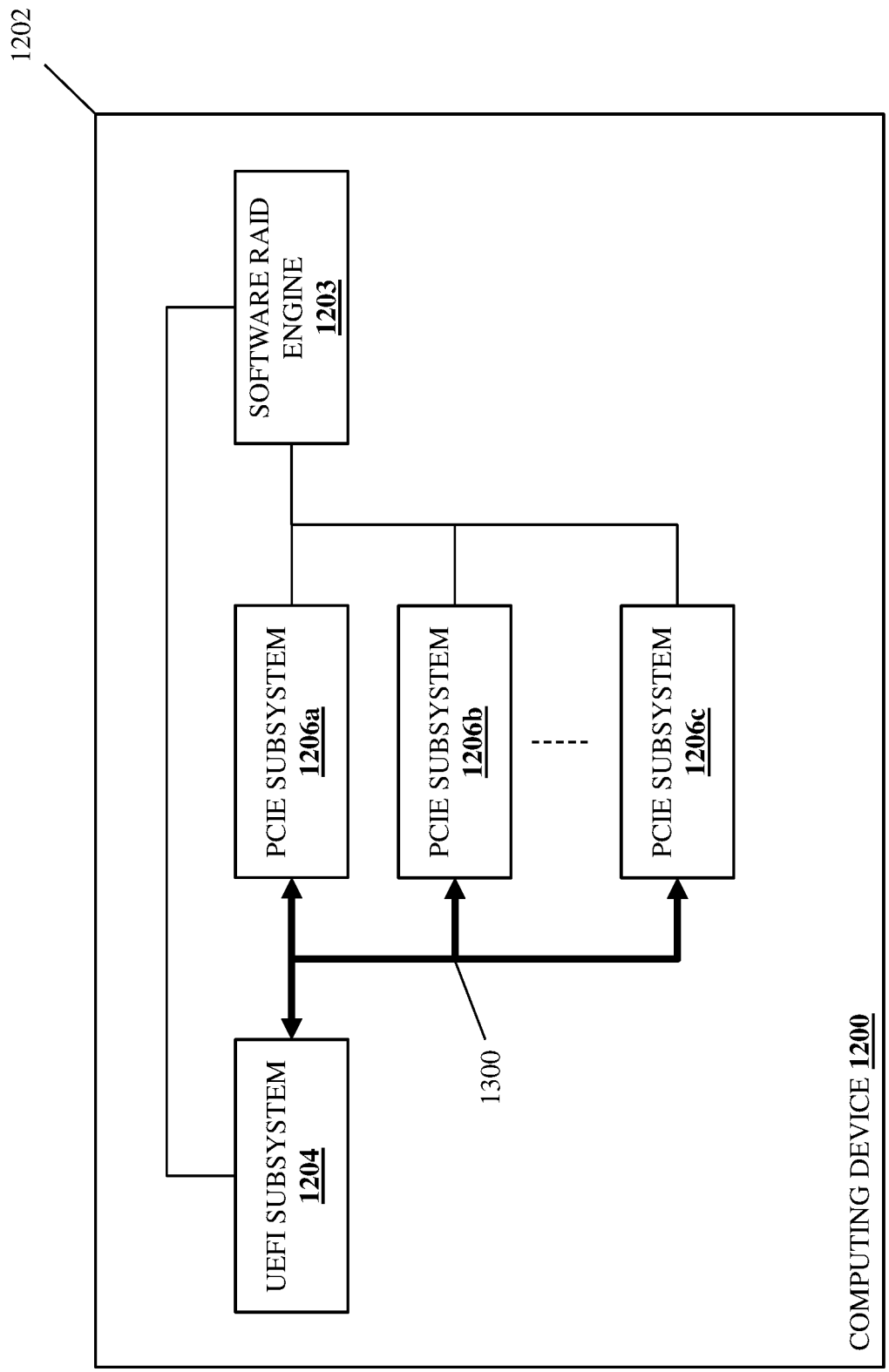
FIG. 13A is a schematic view illustrating an embodiment of the operation of the computing device of FIG. 12 during the method of FIG. 11.

The method 1100 begins at block 1101 where a computing device begins initialization. In an embodiment, at block 1102, the computing device 1200 may be powered on, reset, rebooted, and/or may otherwise begin initialization. With reference to FIG. 13A, in response to the beginning of initialization of the computing device 1200, the UEFI subsystem 1204 may perform PCIe subsystem initialization operations 1300 that include performing initialization operations on the PCIe subsystems 1206*a*-1206*c*. For example, the PCIe subsystem initialization operations 1300 may include the UEFI subsystem 1204 loading an PCIe UEFI bus driver that may be provided by one of the inbox/preinstalled UEFI drivers in the UEFI subsystem 1204 described above, and that PCIe UEFI bus driver may discover one of the PCIe subsystems 1206*a*-1206*c* that includes a PCIe root device (e.g., a PCIe device with a PCIe root device type).

To provide a specific example, the discovery of a PCIe subsystem that includes a PCIe root device may include identifying that the PCIe subsystem includes a physical PCIe device with a Bus:Device:Function (BDF) address of "(0, 0,0)", which one of skill in the art in possession of the present disclosure will appreciate may have been provided to the PCIe device in that PCIe subsystem to designate it as the PCIe root device. However, while a specific example of the discovery of a PCIe root device in a PCIe subsystem has been described, one of skill in the art in possession of the present disclosure will appreciate how the PCIe root device may be discovered using other techniques while remaining within the scope of the present disclosure as well. In response to discovering the PCIe subsystem including the PCIe root device, the PCIe UEFI bus driver may install a PCIe protocol on that PCIe subsystem, claim the PCIe controller device in that PCIe subsystem, create a PCIe root device path (e.g., (0x0) in the examples below), and/or perform any other operations that one of skill in the art in possession of the present disclosure would recognize as enabling the functionality described below.

Figure 13B:
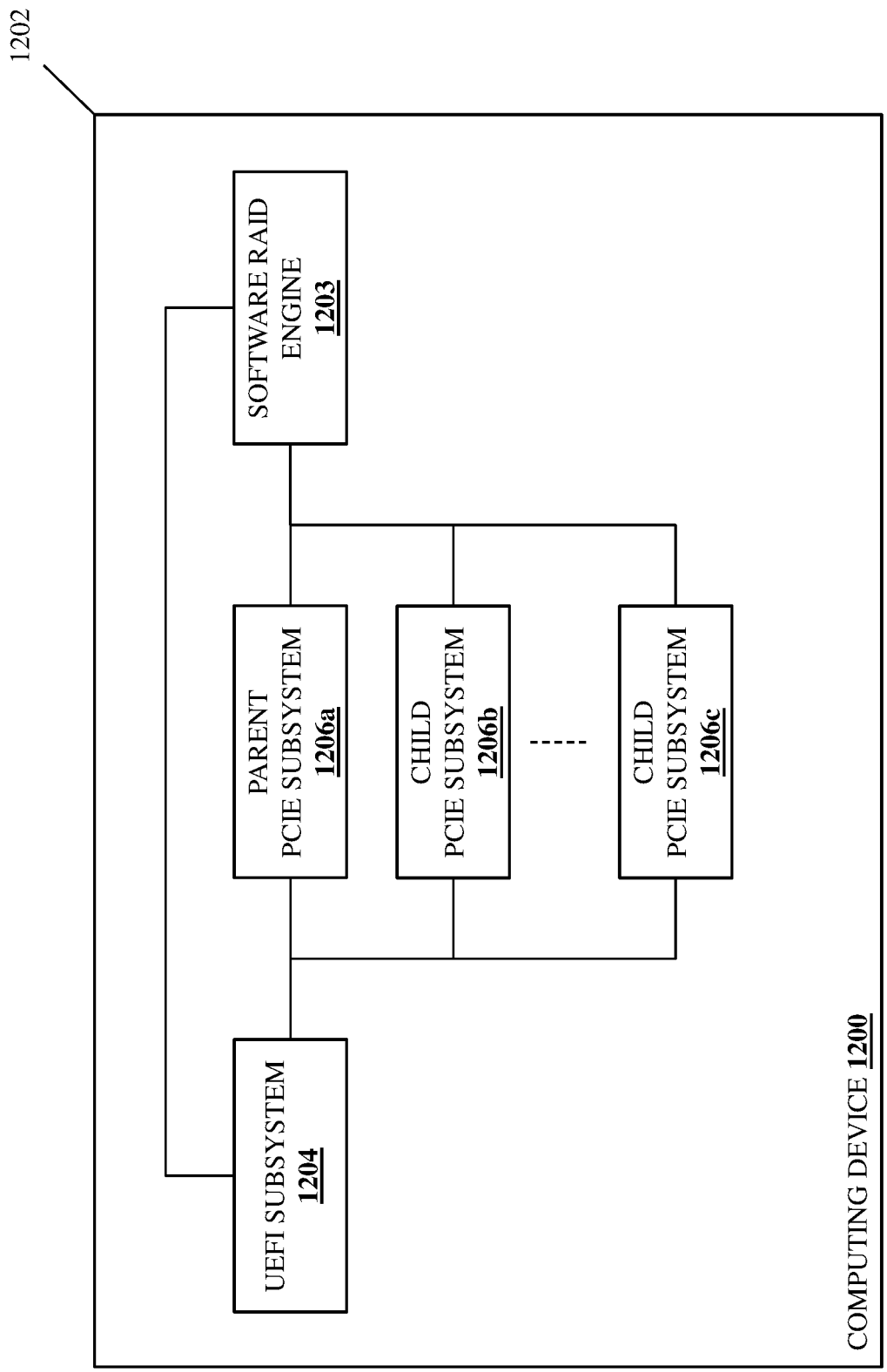
FIG. 13B is a schematic view illustrating an embodiment of the operation of the computing device of FIG. 12 during the method of FIG. 11.

In response to identifying and claiming the PCIe controller device in the PCIe subsystem having the PCIe root device, the PCIe UEFI bus driver may designate that PCIe subsystem as a "parent" PCIe subsystem, and the remaining PCIe subsystems as "child" PCIe subsystems. For example, with reference to FIG. 13B, the PCIe subsystem 1206*a* is illustrated has having been identified as including the PCIe root device, and thus is designated as the "parent" PCIe subsystem 1206*a* having a "parent" PCIe controller device that has been claimed by the PCIe UEFI bus driver. Similarly, the PCIe subsystems 1206*b*-1206*c* are illustrated as having been designated as the "child" PCIe subsystems 1206*b*-1206*c* having a "child" PCIe controller devices, and one of skill in the art in possession of the present disclosure will recognize how PCIe devices in the "child" PCIe subsystems 1206*b*-1206*c* will be connected under the PCIe root device in the "parent" PCIe subsystem 1206*a* discussed above.

Figure 14:
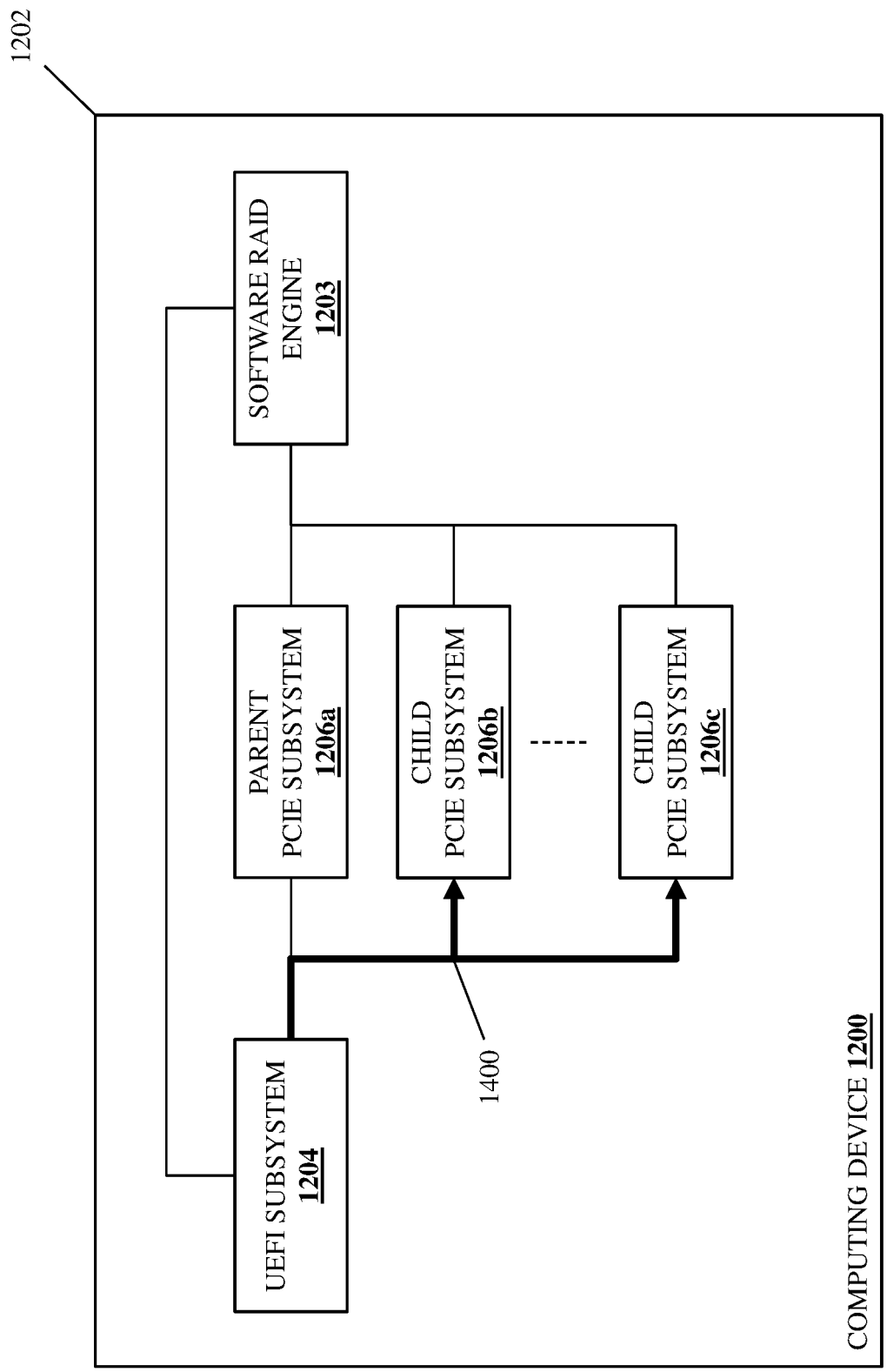
FIG. 14 is a schematic view illustrating an embodiment of the operation of the computing device of FIG. 12 during the method of FIG. 11.

With reference to FIG. 14, the UEFI subsystem 1204 may then perform PCIe protocol installation operations 1400 that may include installing a PCIe protocol on each of the child PCIe subsystems 1206*b*-1206*c*. Furthermore, after installing the PCIe protocol on the child PCIe subsystems 1206*b*-1206*c*, the UEFI subsystem 1204 may create respective PCIe device paths for each child PCIe subsystem 1206-1206*c* connected under the parent PCIe subsystem 1206*a* having the PCIe root device. To provide a specific example, a PCIe device path for a first child PCIe subsystem (0x0, 0x1) may be PCIeRoot(0x0)/PCIe(0x0, 0x1), and one of skill in the art in possession of the present disclosure will appreciate how each of the child PCIe subsystems may have a similar, but unique, device path created for it. However, while specific initialization operations for PCIe subsystems have been described, one of skill in the art in possession of the present disclosure will appreciate the PCIe subsystems 1206*a*-1206*c* may be initialized in a variety of manners to provide the functionality described below while remaining within the scope of the present disclosure as well.

The method 1100 then proceeds to block 1102 where a software RAID subsystem identifies a PCIe subsystem that is not claimed by the UEFI subsystem. As will be appreciated by one of skill in the art in possession of the present disclosure, the inbox/preinstalled UEFI driver/PCIe device claiming process detailed above will result in inbox/preinstalled UEFI drivers in the UEFI subsystem 1204 claiming supported PCIe subsystems (e.g., PCIe endpoint devices such as NVMe storage devices and their controller devices). However, one of skill in the art in possession of the present disclosure will also realize that at least some of the child PCIe controller devices in the child PCIe subsystems 1206b-1206c will not be claimed by the inbox/preinstalled UEFI drivers in the UEFI subsystem 1204.

Figure 15:
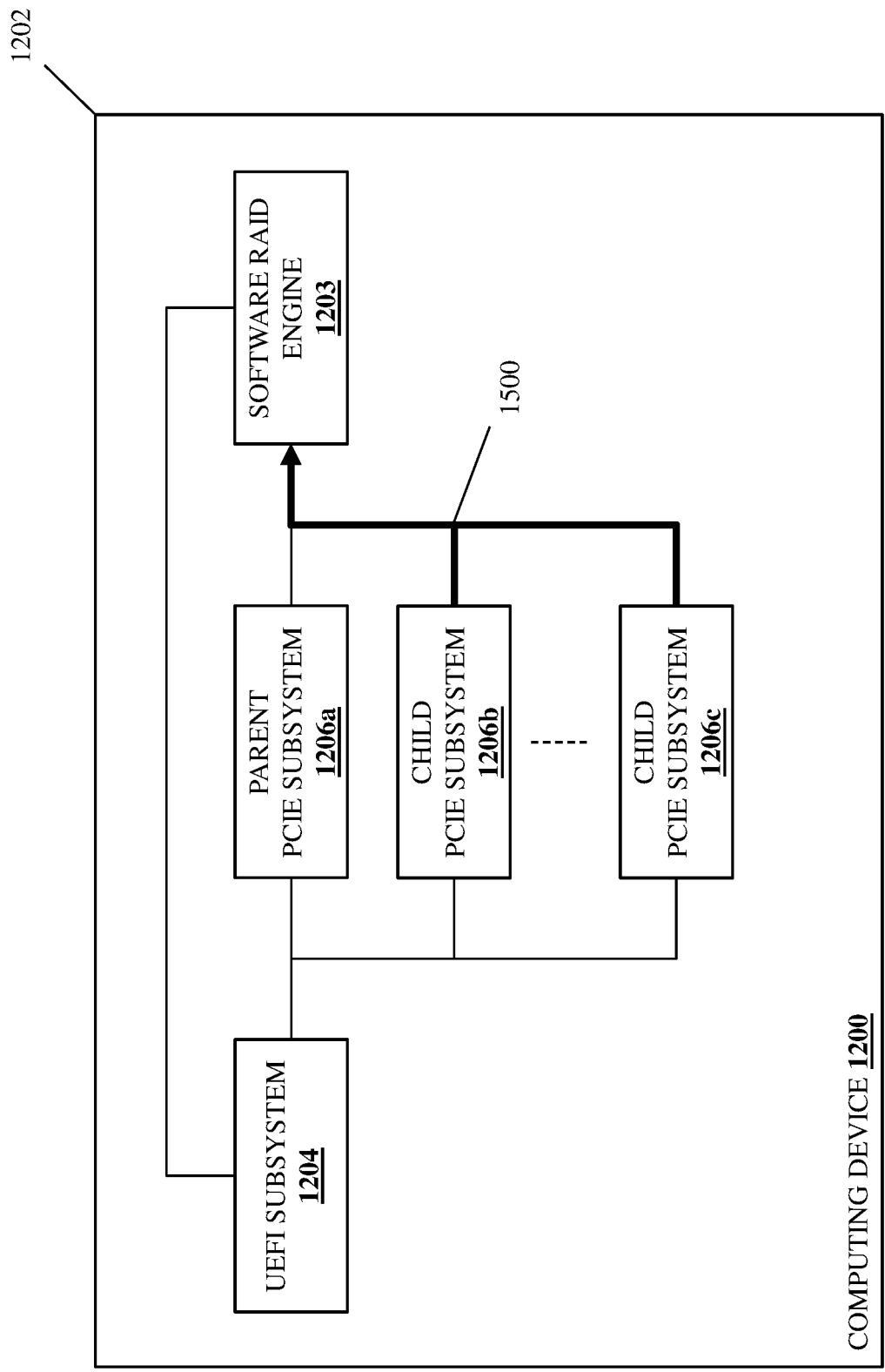
FIG. 15 is a schematic view illustrating an embodiment of the operation of the computing device of FIG. 12 during the method of FIG. 11.

With reference to FIG. 15, in an embodiment of block 1102, the software RAID engine 1203 may perform unclaimed child PCIe subsystem identification operations 1500 that include identifying any of the child PCIe subsystems 1206b-1206c that were not claimed by an inbox/preinstalled UEFI driver in the UEFI subsystem 1204. For example, at block 1102, the software RAID engine 1203 may determine whether a child PCIe subsystem has been claimed by an inbox/preinstalled UEFI driver in the UEFI subsystem 1204 based on the supported callback operations associated with that child PCIe subsystem, described above. To provide a specific example, at block 1102 the software RAID engine 1203 may attempt to open a device path protocol for each of the child PCIe subsystems 1206b-1206c, and one of skill in the art in possession of the present disclosure will appreciate how the attempt to open the device path protocol will fail (e.g., an "EFI_ALREADY_STARTED" message will be returned) if it has already been initiated by the UEFI subsystem 1204 (in which case that child PCIe subsystem has already been claimed by an inbox/preinstalled UEFI driver), and will succeed if it has not yet been initiated by the UEFI subsystem 1204 (in which case that child PCIe subsystem has not been claimed by an inbox/preinstalled UEFI driver).

However, while a specific technique for determining whether a child PCIe subsystem has not been claimed by an inbox/preinstalled UEFI driver has been described, one of skill in the art in possession of the present disclosure will appreciate how unclaimed child PCIe subsystems may be identified using any of a variety of techniques that will fall within the scope of the present disclosure. As such, following block 1102, the software RAID engine 1203 will have identified at least one of the child PCIe subsystems 1206b-1206c that was not claimed by an inbox/preinstalled UEFI driver in the UEFI subsystem 1204.

The method 1100 then proceeds to decision block 1104 where it is determined whether the PCIe subsystem includes a PCIe bridge device or a PCIe root device. In an embodiment, at decision block 1104, the software RAID engine 1203 may perform PCIe bridge device/PCIe root device determination operations that include determining whether the child PCIe subsystem that was determined to have not been claimed by an inbox/preinstalled UEFI driver in the UEFI subsystem 1204 at block 1102 includes a PCIe bridge device or a PCIe root device. For example, at decision block 1104, the software RAID engine 1203 may access a supported callback between the child PCIe subsystem and the UEFI subsystem 1204 (e.g., via its access to that supported callback by the UEFI software RAID driver operating in the UEFI environment as described above), retrieve a class code for that child PCIe subsystem, and determine whether that class code identifies the child PCIe subsystem as including a PCIe bridge device or a PCIe root device. However, while a specific example of determining whether a child PCIe subsystem includes a PCIe bridge device or a PCIe root device has been described, one of skill in the art in possession of the present disclosure will appreciate how other techniques for determining whether a child PCIe subsystem includes a PCIe bridge device or a PCIe root device will fall within the scope of the present disclosure as well.

If, at decision block 1104, it is determined that the PCIe subsystem is not a PCIe bridge device or a PCIe root device, the method 1100 returns to block 1102. As such, the method 1100 may loop such that the software RAID engine 1203 identifies PCIe subsystems that are not claimed by a UEFI driver in the UEFI subsystem 1204 and determines whether those PCIe subsystems include a PCIe bridge device or a PCIe root device until an unclaimed PCIe subsystem is identified that includes a PCIe bridge device or a PCIe root device.

If, at decision block 1104, it is determined that the PCIe subsystem is a PCIe bridge device or a PCIe root device, the method 1100 proceeds to block 1106 where the software RAID subsystem claims the PCIe subsystem. In an embodiment of block 1102 and decision block 1104 and in the specific example provided below, the software RAID engine 1203 may identify the child PCIe subsystem 1206b as having not been claimed by a UEFI driver in the UEFI subsystem 1204 (e.g., based on an "EFI_already_started" flag not being set), may determine that the child PCIe subsystem 1206b includes a PCIe bridge device or a PCIe root device and, in response, may claim the child PCIe subsystem 1206b by installing a RAID protocol on that child PCIe subsystem 1206b as described below and/or using any of a variety of PCIe subsystem claiming techniques that would be apparent to one of skill in the art in possession of the present disclosure.

Figure 16:
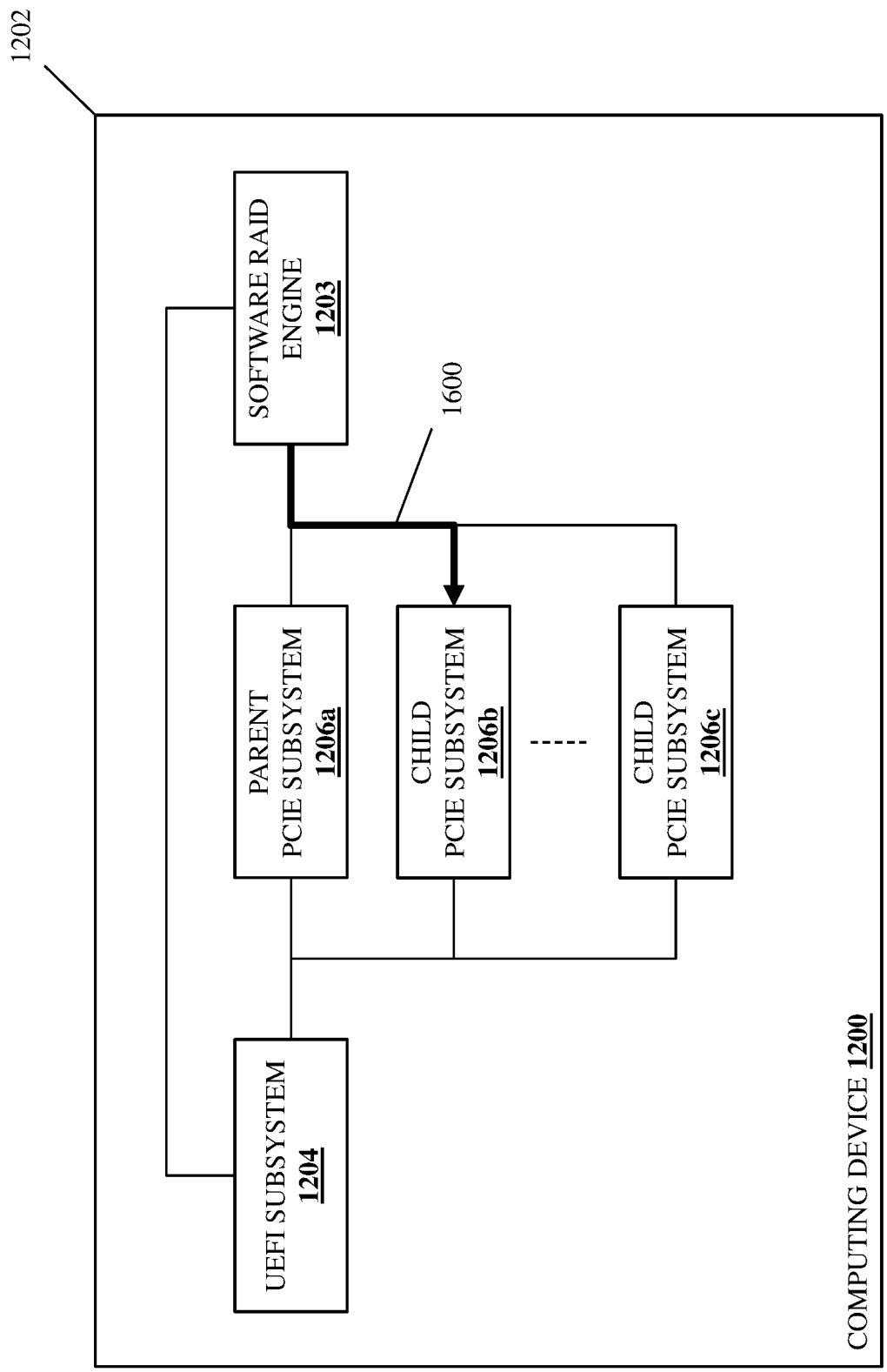
FIG. 16 is a schematic view illustrating an embodiment of the operation of the computing device of FIG. 12 during the method of FIG. 11.

The method 1100 then proceeds to block 1108 where the software RAID subsystem installs a RAID protocol on the PCIe subsystem. With reference to FIG. 16, in an embodiment of block 1108, the software RAID engine 1203 may perform RAID protocol installation operations 1600 that include installing a RAID protocol on the child PCIe subsystem 1206b, which one of skill in the art in possession of the present disclosure will appreciate will allow the child PCIe controller device in the child PCIe subsystem 1206b to be used as the primary controller described in the method 300 discussed above. As such, the unclaimed child PCIe subsystem 1206b that includes a PCIe bridge device or a PCIe root device and that is connected under the parent PCIe subsystem 1206a may have its PCIe controller device designated as the primary controller device that will be used to expose RAID logical storage subsystem(s) provided by PCIe endpoint devices (e.g., NVMe storage devices) in the PCIe subsystems 1206a-1206c to the operating system 204b substantially as described above with reference to the method 300.

Figure 17:
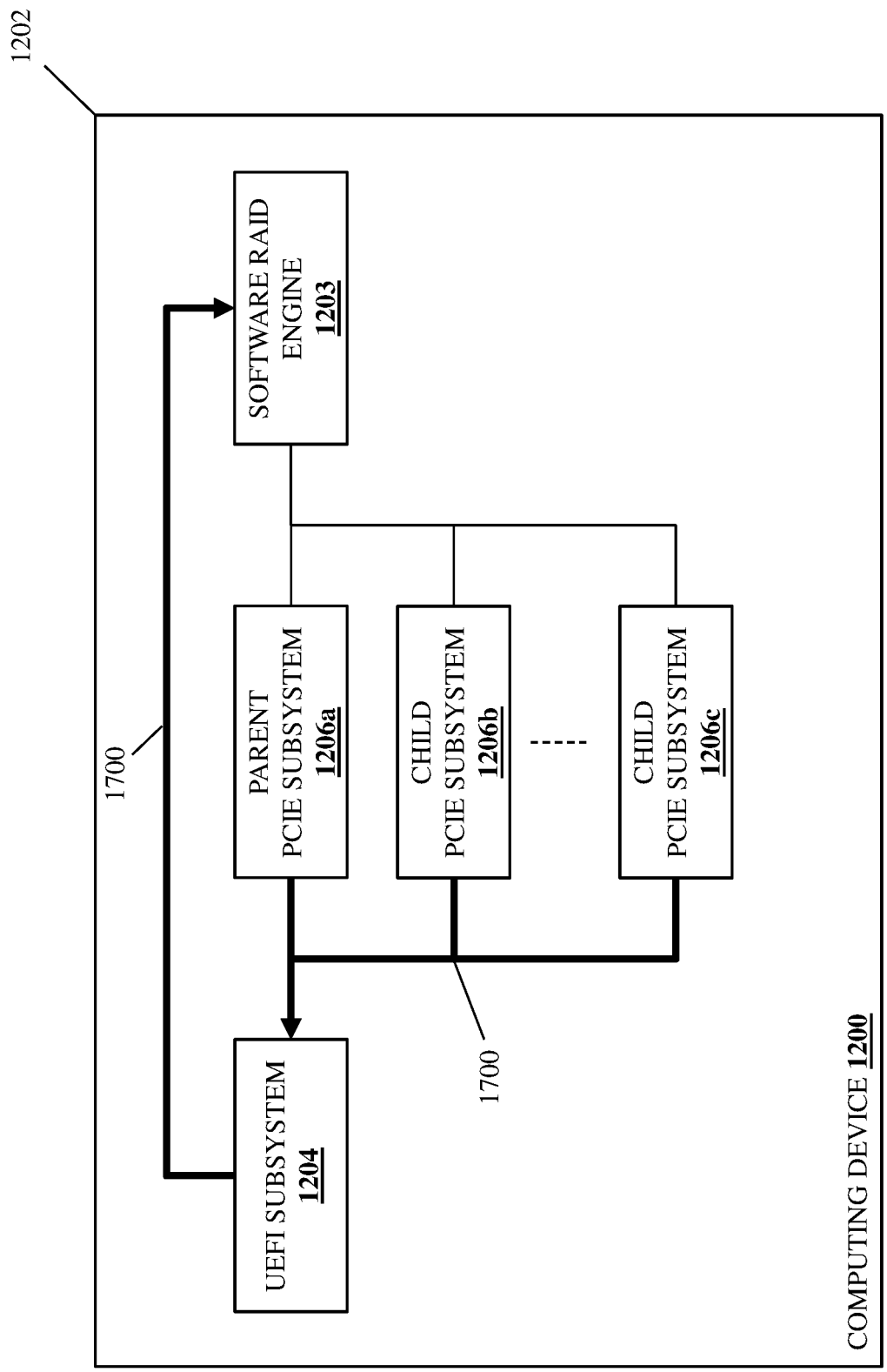
FIG. 17 is a schematic view illustrating an embodiment of the operation of the computing device of FIG. 12 during the method of FIG. 11.

The method 1100 then proceeds to block 1110 where the software RAID subsystem generates at least one RAID logical storage subsystem provided by at least one PCIe endpoint device. With reference to FIG. 17, in an embodiment of block 1110, the software RAID engine 1203 may perform RAID logical storage subsystem information retrieval operations 1700 that may include retrieving RAID logical storage subsystem information from the PCIe subsystems 1206a-1206c via the UEFI subsystem 1204. For example, the RAID logical storage subsystem information retrieval operations 1700 may include the software RAID engine 1203 retrieving identifiers (e.g., "handles") for PCIe endpoint devices (e.g., NVMe storage devices) included in the PCIe subsystems 1206a-1206c (e.g., using UEFI APIs that provide for the retrieval of NVMe endpoint handles or other identifiers), and then performing the passthrough operations discussed above using the UEFI subsystem 1204 to retrieve metadata from PCIe endpoint devices (e.g., NVMe storage devices) included in the PCIe subsystems 1206a-1206c that describe the details of RAID logical storage subsystems that will be provided by those PCIe endpoint devices, as well any other RAID logical storage subsystem information that one of skill in the art in possession of the present disclosure will appreciate may be used to generate the RAID logical storage subsystems described below.

In response to retrieving the metadata and/or other RAID logical storage subsystem information described above, the software RAID engine 1203 may use that metadata and/or other RAID logical storage subsystem information to generate one or more RAID logical storage subsystems that one of skill in the art in possession of the present disclosure will appreciate may be used as described below by the UEFI subsystem to provide for the booting of the operating system 204b in the computing device 200, and one of skill in the art in possession of the present disclosure will appreciate how any of a variety of RAID logical storage subsystem generation techniques may be utilized by the software RAID engine 1203 at block 1110 while remaining within the scope of the present disclosure as well.

Figure 18:
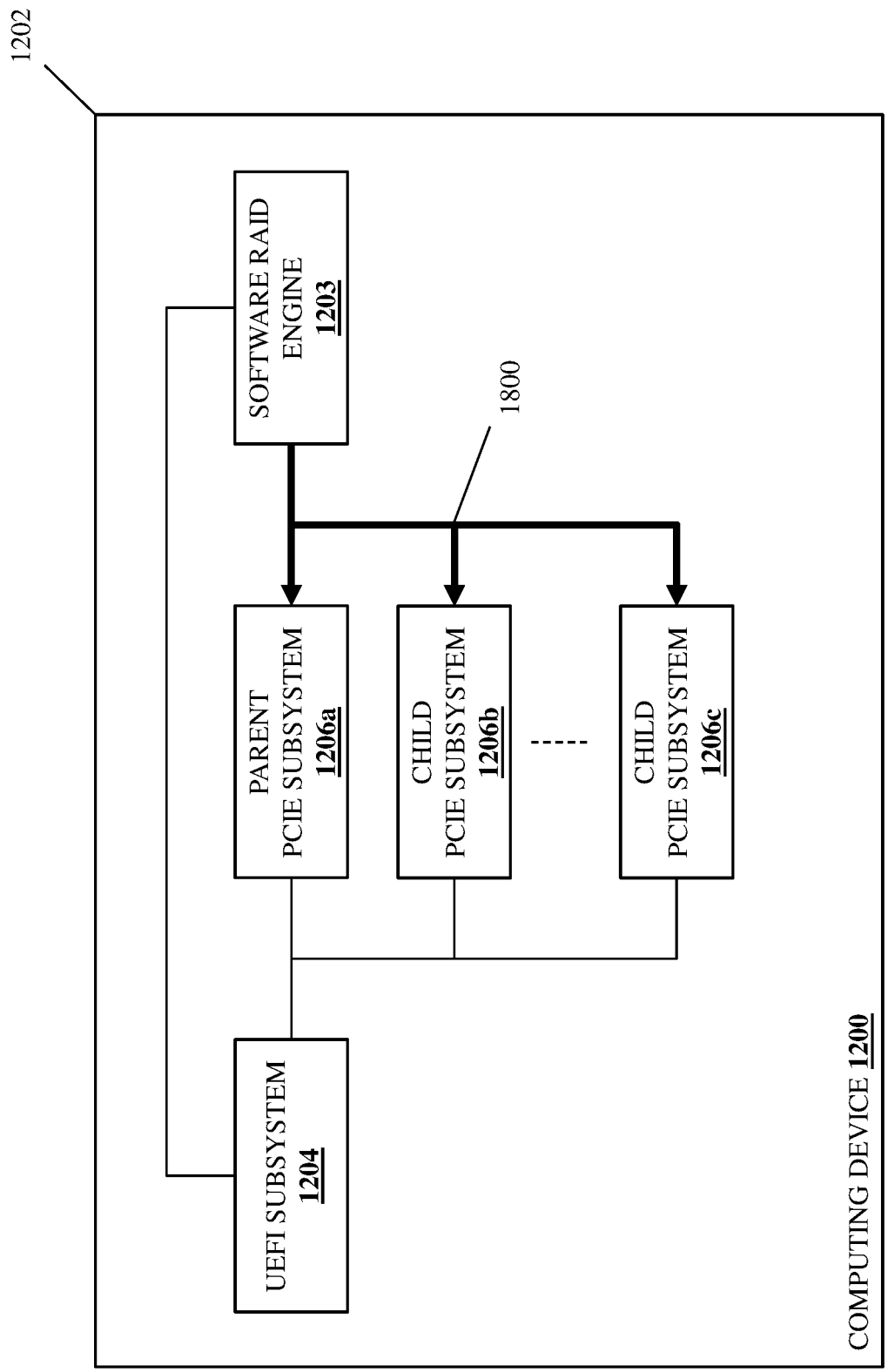
FIG. 18 is a schematic view illustrating an embodiment of the operation of the computing device of FIG. 12 during the method of FIG. 11.

The method 1100 then proceeds to block 1112 where the software RAID subsystem installs a block IO protocol on the at least one RAID logical storage subsystem. With reference to FIG. 18, in an embodiment of block 1112, the software RAID engine 1203 may perform block IO protocol installation operations 1800 that may include installing a block IO protocol on each of the RAID logical storage subsystem(s) provided by the PCIe subsystem 1206a-1206c. As will be appreciated by one of skill in the art in possession of the present disclosure, while the software RAID engine 1203 is illustrated and described as installing the block IO protocol on RAID logical storage subsystems provided by each the PCIe subsystem 1206a-1206c, only some of the PCIe subsystem 1206a-1206c may provide RAID logical storage subsystems upon which the block IO protocol is installed at block 1112 while remaining within the scope of the present disclosure as well.

The method 1100 then proceeds to block 1114 where the software RAID subsystem attaches the at least one RAID logical storage subsystem to the PCIe subsystem. In an embodiment, at block 1114, the software RAID engine 1203 may perform RAID logical storage subsystem/PCIe subsystem attachment operations that may include attaching each of the RAID logical storage subsystems provided by the PCIe subsystems 1206a-1206c to the child PCIe controller device in the child PCIe subsystem 1206b that was identified as unclaimed by a UEFI driver in the UEFI subsystem 1204 and determined to include a PCIe bridge device or PCIe root device, and the child PCIe controller device in that child PCIe subsystem 1206b will operate as the primary controller device that exposes those RAID logical storage subsystem(s) to the UEFI subsystem 1204. For example, at block 1114 the software RAID engine 1203 may create a device path between each the RAID logical storage subsystem(s) and the child PCIe controller device in the child PCIe subsystem 1206b that was identified as unclaimed by a UEFI driver in the UEFI subsystem 1204 and determined to include a PCIe bridge device or PCIe root device. However, while a specific example of attaching RAID logical storage subsystems to a PCIe subsystem has been described, one of skill in the art in possession of the present disclosure will appreciate how RAID logical storage subsystems may be attached to the child PCIe subsystem using a variety of techniques that will fall within the scope of the present disclosure as well.

Figure 19:
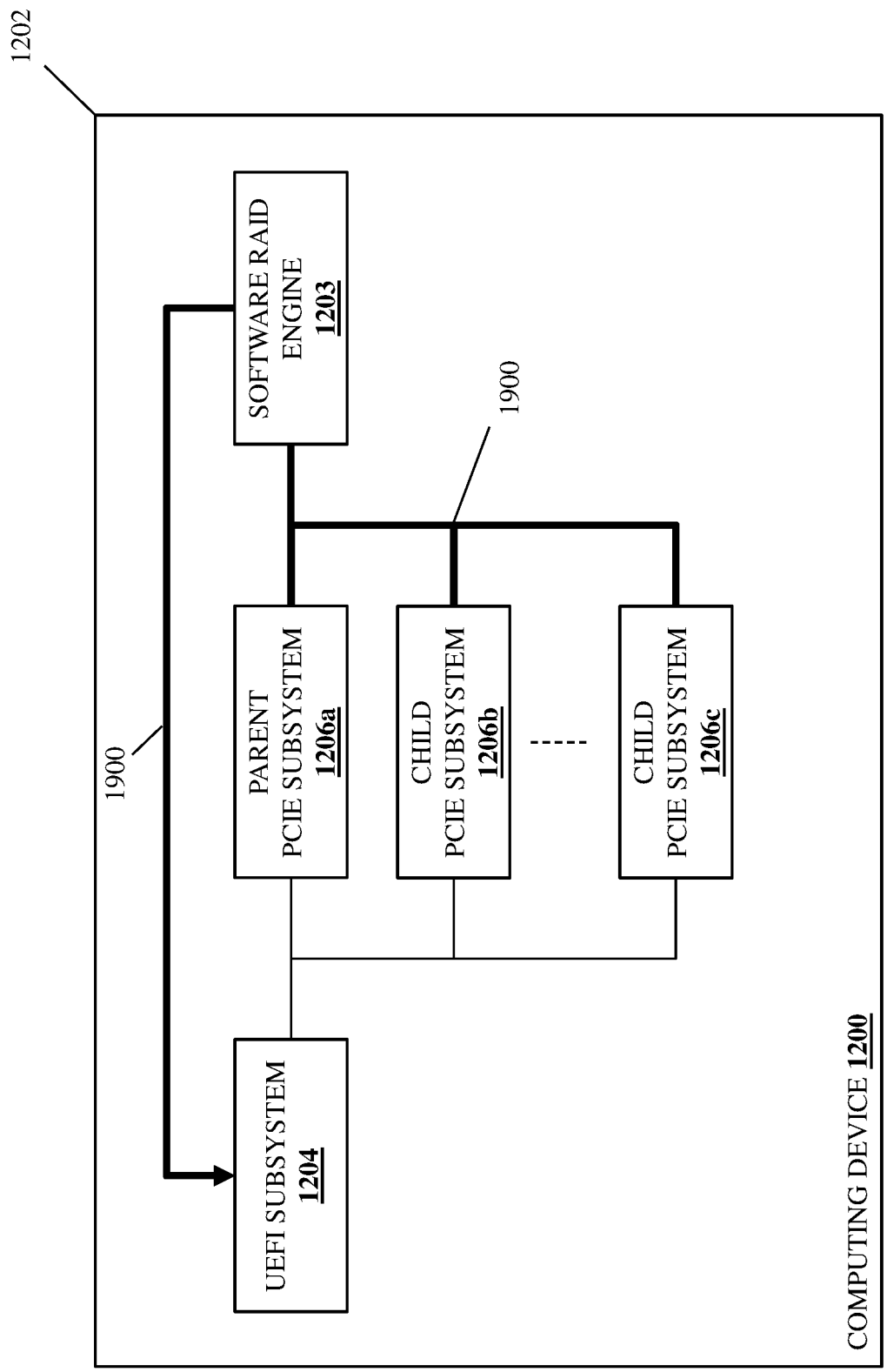
FIG. 19 is a schematic view illustrating an embodiment of the operation of the computing device of FIG. 12 during the method of FIG. 11.

The method 1100 then proceeds to block 1116 where the software RAID subsystem presents a PCIe controller device in the PCIe subsystem as connected to the at least one RAID logical storage subsystem. With reference to FIG. 19, in an embodiment of block 1116, the software RAID engine 1203 may perform PCIe-controller-device-connected RAID logical storage subsystem presentment operations 1900 that may include presenting any RAID logical storage subsystems provided by PCIe endpoints (e.g., NVMe storage devices) in the PCIe subsystems 1206a-1206c to the UEFI subsystem 1204 as being connected to the child PCIe controller device in the child PCIe subsystem 1206b that was identified as unclaimed by a UEFI driver in the UEFI subsystem 1204 and determined to include a PCIe bridge device or PCIe root device. For example, at block 1116, the software RAID engine 1203 may expose to the UEFI subsystem 1204 each of the device paths that were created at block 1114 between each the RAID logical storage subsystem(s) and the child PCIe controller device in the child PCIe subsystem 1206b that was identified as unclaimed by a UEFI driver in the UEFI subsystem 1204 and determined to include a PCIe bridge device or PCIe root device. As will be appreciated by one of skill in the art in possession of the present disclosure, in the event boot information (e.g., a boot partition) is available on the RAID logical storage subsystem(s) exposed to the UEFI subsystem 1204, it may be used by the UEFI subsystem 1204 to boot the operating system 204b in the computing device 200.

Thus, systems and methods have been described that identify an unclaimed PCIe bridge device or PCIe root device, and use its PCIe controller device to present RAID logical storage subsystem(s) provided by PCIe endpoint device(s) to a UEFI subsystem. For example, the direct-attached storage device software RAID boot system of the present disclosure may include a chassis housing PCIe subsystems coupled to a UEFI subsystem and a software RAID subsystem. The software RAID subsystem identifies a first PCIe subsystem that is not claimed by a UEFI driver provided by the UEFI subsystem, and determines that the first PCIe subsystem is one of a PCIe bridge device or a PCIe root device. In response, the software RAID subsystem claims the first PCIe subsystem, installs a RAID protocol on the first PCIe subsystem, attaches at least one RAID logical storage subsystem provided by at least one PCIe endpoint device in the PCIe subsystems to the first PCIe subsystem, and presents the UEFI subsystem with a PCIe controller device in the first PCIe subsystem as being connected to the at least RAID logical storage subsystem. As such, the UEFI subsystem in a computing device without a native controller device may boot an operating system using the RAID logical storage subsystem(s).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A direct-attached storage device software Redundant Array of Independent Disk (RAID) boot system, comprising:
   a chassis;
   a plurality of Peripheral Component Interconnect express (PCIe) subsystems that are included in the chassis;
   a Unified Extensible Firmware Interface (UEFI) subsystem that is included in the chassis and that is coupled to the plurality of PCIe subsystems; and
   a software Redundant Array of Independent Disk (RAID) subsystem that is included in the chassis, that is coupled to the plurality of PCIe subsystems, and that is configured to:
      identify, from the plurality of PCIe subsystems, a first PCIe subsystem that is not claimed by a UEFI driver provided by the UEFI subsystem; and
      determine that the first PCIe subsystem is one of a PCIe bridge device or a PCIe root device and, in response:
         claim the first PCIe subsystem;
         install a RAID protocol on the first PCIe subsystem;
         attach, to the first PCIe subsystem, at least one RAID logical storage subsystem provided by at least one PCIe endpoint device that is included in the plurality of PCIe subsystems; and
         present, to the UEFI subsystem, a PCIe controller device that is included in the first PCIe subsystem as connected to the at least RAID logical storage subsystem.

2. The system of claim 1, wherein the software RAID subsystem is configured to identify the first PCIe subsystem that is not claimed by the UEFI driver provided by the UEFI subsystem by:
   attempting to open a device path protocol associated with the first PCIe subsystem; and
   determining that the attempt to open the device path protocol has failed because it has already been initiated by the UEFI subsystem.

3. The system of claim 1, wherein the software RAID subsystem is configured to determine that the first PCIe subsystem is one of a PCIe bridge device or a PCIe root device by:
   accessing a class code in a supported callback associated with the first PCIe subsystem.

4. The system of claim 1, wherein the software RAID subsystem is configured to:
   retrieve, via the UEFI subsystem, respective RAID logical storage subsystem information from each of the plurality of PCIe subsystems; and
   generate, using the respective RAID logical storage subsystem information retrieved from each of the plurality of PCIe subsystems, the at least one RAID logical storage subsystem.

5. The system of claim 1, wherein the software RAID subsystem is configured to:
   install, on each of the at least one RAID logical storage subsystem, a block Input/Output (IO) protocol.

6. The system of claim 1, wherein the software RAID subsystem is configured to:
   designate the first PCIe subsystem as a parent device;
   add each of the at least one RAID logical storage subsystem under the parent device; and
   create a respective PCIe device path from the first PCIe subsystem to each of the at least one RAID logical storage subsystem.

7. The system of claim 1, wherein the UEFI subsystem is configured to:
   boot an operating system that is provided in the chassis using the at least one RAID logical storage subsystem.

8. An Information Handling System (IHS), comprising:
   a processing system; and
   a memory system that is coupled to the processing system and that includes instructions that, when executed by the processing system, cause the processing system to provide a software Redundant Array of Independent Disk (RAID) engine that is configured to:
      identify, from a plurality of Peripheral Component Interconnect express (PCIe) subsystems that are coupled to the processing system, a first PCIe subsystem that is not claimed by a Unified Extensible Firmware Interface (UEFI) driver provided by a UEFI subsystem that is coupled to the processing system; and
      determine that the first PCIe subsystem is one of a PCIe bridge device or a PCIe root device and, in response:
         claim the first PCIe subsystem;
         install a RAID protocol on the first PCIe subsystem;
         attach, to the first PCIe subsystem, at least one RAID logical storage subsystem provided by at least one PCIe endpoint device that is included in the plurality of PCIe subsystems; and
         present, to the UEFI subsystem, a PCIe controller device that is included in the first PCIe subsystem as connected to the at least RAID logical storage subsystem.

9. The IHS of claim 8, wherein the software RAID engine is configured to identify the first PCIe subsystem that is not claimed by the UEFI driver provided by the UEFI subsystem by:
   attempting to open a device path protocol associated with the first PCIe subsystem; and
   determining that the attempt to open the device path protocol has failed because it has already been initiated by the UEFI subsystem.

10. The IHS of claim 8, wherein the software RAID engine is configured to determine that the first PCIe subsystem is one of a PCIe bridge device or a PCIe root device by:
    accessing a class code in a supported callback associated with the first PCIe subsystem.

11. The IHS of claim 8, wherein the software RAID engine is configured to:
    retrieve, via the UEFI subsystem, respective RAID logical storage subsystem information from each of the plurality of PCIe subsystems; and
    generate, using the respective RAID logical storage subsystem information retrieved from each of the plurality of PCIe subsystems, the at least one RAID logical storage subsystem.

12. The IHS of claim 8, wherein the software RAID engine is configured to:
    designate the first PCIe subsystem as a parent device;
    add each of the at least one RAID logical storage subsystem under the parent device; and
    create a respective PCIe device path from the first PCIe subsystem to each of the at least one RAID logical storage subsystem.

13. The IHS of claim 8, wherein the at least one RAID logical storage subsystem is configured for use by the UEFI subsystem to boot an operating system that is coupled to the processing system.

14. A method for booting a direct-attached storage device software Redundant Array of Independent Disk (RAID), comprising:

identifying, by a software Redundant Array of Independent Disk (RAID) subsystem from a plurality of Peripheral Component Interconnect express (PCIe) subsystems, a first PCIe subsystem that is not claimed by a Unified Extensible Firmware Interface (UEFI) driver provided by a UEFI subsystem; and determining, by the software RAID subsystem, that the first PCIe subsystem is one of a PCIe bridge device or a PCIe root device and, in response:

claiming, by the software RAID subsystem, the first PCIe subsystem;

installing, by the software RAID subsystem, a RAID protocol on the first PCIe subsystem;

attaching, by the software RAID subsystem to the first PCIe subsystem, at least one RAID logical storage subsystem provided by at least one PCIe endpoint device that is included in the plurality of PCIe subsystems; and presenting, by the software RAID subsystem to the UEFI subsystem, a PCIe controller device that is included in the first PCIe subsystem as connected to the at least RAID logical storage subsystem.

15. The method of claim 14, wherein the identifying the first PCIe subsystem that is not claimed by the UEFI driver provided by the UEFI subsystem includes:

attempting, by the software RAID subsystem, to open a device path protocol associated with the first PCIe subsystem; and determining, by the software RAID subsystem, that the attempt to open the device path protocol has failed because it has already been initiated by the UEFI subsystem.

16. The method of claim 15, wherein the determining that the first PCIe subsystem is one of a PCIe bridge device or a PCIe root device includes:

accessing, by the software RAID subsystem, a class code in a supported callback associated with the first PCIe subsystem.

17. The method of claim 14, further comprising:

retrieving, by the software RAID subsystem via the UEFI subsystem, respective RAID logical storage subsystem information from each of the plurality of PCIe subsystems; and generating, by the software RAID subsystem using the respective RAID logical storage subsystem information retrieved from each of the plurality of PCIe subsystems, the at least one RAID logical storage subsystem.

18. The method of claim 14, further comprising:

installing, by the software RAID subsystem on each of the at least one RAID logical storage subsystem, a block Input/Output (IO) protocol.

19. The method of claim 14, further comprising:

designating, by the software RAID subsystem, the first PCIe subsystem as a parent device;

adding, by the software RAID subsystem, each of the at least one RAID logical storage subsystem under the parent device; and creating, by the software RAID subsystem, a respective PCIe device path from the first PCIe subsystem to each of the at least one RAID logical storage subsystem.

20. The method of claim 14, further comprising:

booting, by the UEFI subsystem, an operating system that is provided in the chassis using the at least one RAID logical storage subsystem.

\* \* \* \* \*